United States Patent [19]

Huang et al.

[11] Patent Number: 5,319,844

[45] Date of Patent: Jun. 14, 1994

[54] METHOD OF MAKING AN ELECTROMAGNETIC TRANSDUCER

[75] Inventors: Hao Huang, Aurora, Colo.; Gene A. Fisher, Pinellas Park, Fla.

[73] Assignee: Unique Mobility, Inc., Englewood, Colo.

[21] Appl. No.: 81,750

[22] Filed: Jun. 24, 1993

Related U.S. Application Data

[63] Continuation of Ser. No. 502,230, Mar. 30, 1990, abandoned, which is a continuation-in-part of Ser. No. 125,781, Nov. 27, 1987, Pat. No. 5,004,944, which is a continuation of Ser. No. 812,306, Dec. 23, 1985, abandoned.

[51] Int. Cl.$^5$ ...................... H02K 15/02; H02K 15/10
[52] U.S. Cl. ........................................ 29/598; 29/605; 29/606; 29/608
[58] Field of Search ................. 29/596, 598, 605, 606, 29/608; 310/42, 43, 44, 45, 156, 266

[56] References Cited

U.S. PATENT DOCUMENTS

| | | |
|---|---|---|
| 464,026 | 12/1891 | Kammeyer. |
| 1,456,955 | 5/1923 | Wagner. |
| 2,721,284 | 10/1955 | Elmer. |
| 2,792,511 | 5/1957 | Horstman. |
| 3,069,557 | 12/1962 | Skelton. |
| 3,069,577 | 12/1962 | Lee. |
| 3,082,337 | 3/1963 | Horsley. |
| 3,121,851 | 2/1964 | Packard ............................. 310/266 |
| 3,125,402 | 3/1964 | Kruckenberg. |
| 3,128,402 | 4/1964 | Amick, Jr. .......................... 310/266 |
| 3,237,036 | 2/1966 | Konig. |
| 3,297,891 | 1/1967 | Foran, Jr.. |
| 3,322,986 | 5/1967 | Benatti et al.. |
| 3,396,296 | 8/1968 | Esters ............................... 310/266 |
| 3,495,114 | 2/1970 | Kazansky. |
| 3,518,469 | 6/1970 | Storsand. |
| 3,566,165 | 2/1971 | Lohr. |
| 3,567,980 | 3/1971 | Kreuter. |
| 3,602,749 | 8/1971 | Esters ............................... 310/266 |
| 3,638,056 | 1/1972 | Imris. |
| 3,659,129 | 4/1972 | Pettersen. |
| 3,729,642 | 4/1973 | Esters ............................... 310/112 |
| 3,858,071 | 12/1974 | Griffing et al.. |
| 3,861,484 | 1/1975 | Joslin. |
| 3,874,472 | 4/1975 | Deane. |
| 3,882,950 | 5/1975 | Strohlein. |

(List continued on next page.)

FOREIGN PATENT DOCUMENTS

| | | |
|---|---|---|
| 630515 | 4/1963 | Belgium. |
| 1029788 | 4/1978 | Canada. |
| 0230639 | 8/1987 | European Pat. Off.. |
| 0843866 | 5/1952 | Fed. Rep. of Germany ...... 310/266 |
| 2824257 | 12/1979 | Fed. Rep. of Germany. |
| 2925798 | 2/1981 | Fed. Rep. of Germany. |
| 3031423 | 2/1982 | Fed. Rep. of Germany ........ 310/64 |

(List continued on next page.)

OTHER PUBLICATIONS

Promising Applications of Neodymium Boron Iron Magnets in Electrical Machines (Invited), Pahman et al, IEEE Transactionos on Magnetics, vol. MAG-21, No. 5, Sep. 1985, pp. 1712-1719.

European Search Report dated May 19, 1987, EP 86 11 7875.

Rare-Earth Magnets Provide Maximum Performance, K. Iijima, Tamasawa Seiko Co., Ltd., Tokyo, Japan, JEE, J. Electron, Eng. (Japan) vol. 24, No. 247 76-8 7/87.

(List continued on next page.)

*Primary Examiner*—Timothy V. Eley
*Attorney, Agent, or Firm*—Stevens, Davis, Miller & Mosher

[57] ABSTRACT

The method includes fabricating a plurality of elongated high permeability flux carrying members, and preparing n wire bundles each having a predetermined length. The n wire bundles are wound to provide a distributed winding configuration having a plurality of elongated open spaces. The plurality of flux carrying members are inserted into the plurality of open spaces to provide a winding/flux carrying member assembly. A bonding material is provided around the winding/flux carrying member assembly to provide a rigid structure.

20 Claims, 11 Drawing Sheets

U.S. PATENT DOCUMENTS

| | | | |
|---|---|---|---|
| 3,908,141 | 9/1975 | Lemonnier . | |
| 3,965,382 | 6/1976 | McCrosky et al. . | |
| 4,004,167 | 1/1977 | Meckling . | |
| 4,011,479 | 3/1977 | Volkrodt | 310/181 |
| 4,016,444 | 5/1977 | Gillet . | |
| 4,025,831 | 5/1977 | Webb . | |
| 4,065,702 | 12/1977 | Locker et al. . | |
| 4,110,652 | 8/1978 | McGahern . | |
| 4,114,057 | 9/1978 | Esters . | |
| 4,117,519 | 9/1978 | Shioyama et al. . | |
| 4,146,809 | 3/1979 | Rielly . | |
| 4,149,309 | 4/1979 | Mitsui . | |
| 4,169,235 | 9/1979 | Higuchi et al. . | |
| 4,222,450 | 9/1980 | Fobbs . | |
| 4,233,858 | 11/1980 | Rowlett . | |
| 4,249,099 | 3/1981 | Bhongbhibhat et al. . | |
| 4,264,836 | 4/1981 | Dukshtau et al. . | |
| 4,277,709 | 7/1981 | Spirk . | |
| 4,289,989 | 9/1981 | Schibline . | |
| 4,291,457 | 9/1981 | Heyraud | 310/266 |
| 4,316,111 | 2/1982 | Merki et al. . | |
| 4,327,303 | 4/1982 | Jacobsen . | |
| 4,390,806 | 6/1983 | O'Brien et al. . | |
| 4,427,911 | 1/1984 | Manson . | |
| 4,429,245 | 1/1984 | Müller et al. . | |
| 4,434,389 | 2/1984 | Langley et al. . | |
| 4,443,727 | 4/1984 | Annen et al. . | |
| 4,447,750 | 5/1984 | Howlett et al. . | |
| 4,451,749 | 5/1984 | Kanayama | 310/89 |
| 4,453,101 | 6/1984 | Nelson . | |
| 4,458,168 | 7/1984 | Welburn . | |
| 4,467,232 | 8/1984 | Eichhorn et al. . | |
| 4,469,970 | 9/1984 | Neumann . | |
| 4,471,248 | 9/1984 | Smetana . | |
| 4,472,650 | 9/1984 | Advolotkin et al. . | |
| 4,480,206 | 10/1984 | Manson . | |
| 4,484,083 | 11/1984 | Jefferies . | |
| 4,484,094 | 11/1984 | Ade et al. . | |
| 4,486,678 | 12/1984 | Olson . | |
| 4,486,679 | 12/1984 | Jones . | |
| 4,497,001 | 1/1985 | Hayashi et al. . | |
| 4,501,980 | 2/1985 | Welburn . | |
| 4,501,984 | 2/1985 | Mishima . | |
| 4,504,755 | 3/1985 | Semones et al. . | |
| 4,508,998 | 4/1985 | Hahn . | |
| 4,523,445 | 7/1985 | Iwamoto et al. . | |
| 4,531,071 | 7/1985 | Kintz, Jr. et al. . | |
| 4,540,906 | 9/1985 | Blom . | |
| 4,543,506 | 9/1985 | Kawada et al. . | |
| 4,547,713 | 10/1985 | Langley et al. . | |
| 4,550,267 | 10/1985 | Vaidya . | |
| 4,553,075 | 11/1985 | Brown et al. . | |
| 4,556,810 | 12/1985 | Kasper et al. . | |
| 4,556,828 | 12/1985 | Thompson . | |
| 4,559,463 | 12/1985 | Kobayashi . | |
| 4,563,622 | 1/1986 | Deavers et al. . | |
| 4,564,778 | 1/1986 | Yoshida | 310/181 |
| 4,564,781 | 1/1986 | Arnegger . | |
| 4,564,793 | 1/1986 | Reffelt . | |

(List continued on next page.)

FOREIGN PATENT DOCUMENTS

| | | | |
|---|---|---|---|
| 3031420 | 3/1982 | Fed. Rep. of Germany | 310/64 |
| 3420995 | 8/1985 | Fed. Rep. of Germany . | |
| 3224904 | 11/1986 | Fed. Rep. of Germany . | |
| 999112 | 1/1952 | France . | |
| 1272083 | 8/1961 | France . | |
| 2036866 | 12/1970 | France . | |
| 2243512 | 4/1975 | France . | |
| 2556897 | 6/1985 | France . | |

(List continued on next page.)

OTHER PUBLICATIONS

Application of Permanent Magnets in Electromechanical Power Converters; the Impact of Nd-Fe-B Magnets; H. Zijistra; Philips Res. Labs., Eindhoven, Netherlands; J. Phys. Colloq. (France) vol. 46, No. C-6 3-8 Sep. 1985.

Rare-Earth Motors Shed Their Exotic Image; B. H. Carlisle; Mach. Des. (USA) vol. 58, No. 2 18-19, 22, 24, 26 23 Jan. 1986.

Changing Permanent Magnet Technology; K. Vollbrecht; IEEE, Nat. Electr. Manuf. Assoc.; Proceedings of the 17th Electrical/Electronics Insulation Conf., New York, USA 376 pp. (Conference Paper).

A New Concept for Urban Transit Vehicle Drives Tested at the Hamburger Hochbahn; P. Wegener; Brown, Boveri & Cie AG, Mannheim, Germany; Z. Eisenbahnwes, Verkehrstech (Glasers Ann.) (Germany) vol. 109, No. 2-3 97-102 Feb.-Mar. 1985.

Effects on Ellipsometric Parameters Caused by Heat Treatment of Silicon Surface; S. Kondo, L. J. Hanekamp, A. Van Silfhout; Dept. of Appl. Phys., Twente Univ. of Technol., Enschede, Netherlands, Surf. Sci. (Netherlands) vol. 65, No. 2 633-40 Jul. 1977.

(List continued on next page.)

U.S. PATENT DOCUMENTS

| | | |
|---|---|---|
| 4,568,862 | 2/1986 | Tassinario . |
| 4,577,139 | 3/1986 | Reinhardt et al. . |
| 4,585,967 | 4/1986 | Mayer et al. . |
| 4,587,450 | 5/1986 | Ozaki . |
| 4,608,505 | 8/1986 | Schumacher . |
| 4,609,862 | 9/1986 | Becker .................................. 310/198 |
| 4,611,137 | 9/1986 | Sutrina . |
| 4,614,888 | 9/1986 | Mosher et al. . |
| 4,618,792 | 10/1986 | Yates . |
| 4,618,806 | 10/1986 | Grouse . |
| 4,623,812 | 11/1986 | Van De Griend . |
| 4,625,135 | 11/1986 | Kasabian . |
| 4,629,917 | 12/1986 | Brem . |
| 4,629,921 | 12/1986 | Gavaletz . |
| 4,631,435 | 12/1986 | McCarty . |
| 4,633,149 | 12/1986 | Welterlin . |
| 4,636,675 | 1/1987 | Takahashi . |
| 4,636,677 | 1/1987 | Yasuhara . |
| 4,639,626 | 1/1987 | McGee . |
| 4,639,627 | 1/1987 | Takekoshi et al. . |
| 4,641,051 | 2/1987 | Auinger . |
| 4,642,886 | 2/1987 | Muck et al. . |
| 4,644,201 | 2/1987 | Tani et al. . |
| 4,647,804 | 3/1987 | Wefel . |
| 4,649,303 | 3/1987 | Hirao . |
| 4,658,165 | 4/1987 | Vanderschaeghe . |
| 4,658,167 | 4/1987 | Popov et al. . |
| 4,658,170 | 4/1987 | Ueda . |
| 4,661,737 | 4/1987 | Barri . |
| 4,667,125 | 5/1987 | Kaminski et al. . |
| 4,670,622 | 6/1987 | Livingston, Jr. . |
| 4,670,680 | 6/1987 | Andle . |
| 4,672,247 | 6/1987 | Madsen et al. . |
| 4,678,954 | 7/1987 | Takeda et al. . |
| 4,682,069 | 7/1987 | Stahl . |
| 4,689,532 | 8/1987 | Howlett . |
| 4,694,210 | 9/1987 | Elliott et al. . |
| 4,695,754 | 9/1987 | Popov et al. . |
| 4,697,114 | 9/1987 | Amemiya et al. . |
| 4,698,538 | 10/1987 | Yoshida . |
| 4,709,179 | 11/1987 | Banon et al. . |
| 4,714,851 | 12/1987 | Bertram et al. . |
| 4,719,381 | 1/1988 | Miles . |
| 4,731,554 | 3/1988 | Hall et al. . |
| 4,734,606 | 3/1988 | Hajec . |
| 4,900,965 | 2/1990 | Fisher .................................. 310/266 |

FOREIGN PATENT DOCUMENTS

| | | |
|---|---|---|
| 56-94938 | 7/1981 | Japan . |
| 57-62742 | 4/1982 | Japan . |
| 57-126265 | 8/1982 | Japan . |
| 1239795 | 6/1986 | U.S.S.R. . |
| 2140219 | 11/1984 | United Kingdom . |
| 2184613 | 11/1984 | United Kingdom . |

OTHER PUBLICATIONS

Wheel Hub Motors Applied to Electric Vehicle Propulsion; A. W. Beishline, G. S. Goldman; Gold Line Eng., Fullerton, Calif.; Proc Intersoc Energy Convers Eng COnf 14th, vol. 1, Boston Mass., Aug. 5-10, 1979, Publ by Am Chem Soc, Wash, D.C., 1979.

Demonstration of Inductor Motor/Alternator/Flywheel Energy Storage System; Technical Quarterly Progress Report No. 2, Sep. 28, 1976–Dec. 28, 1976 General Electric Co., Schenectady, N.Y.

High-Speed, High-Efficiency Permanent Magnetic Motor-Generator; A. R. Millner; MIT, Lincoln Lab, Lexington, Mass.-Proc of the Int Workshop on Rare Earth-Cobalt Perm Magnets and Their Appl. 3rd. Univ of Ca, La Jolla, Jun. 27-30, 1978.

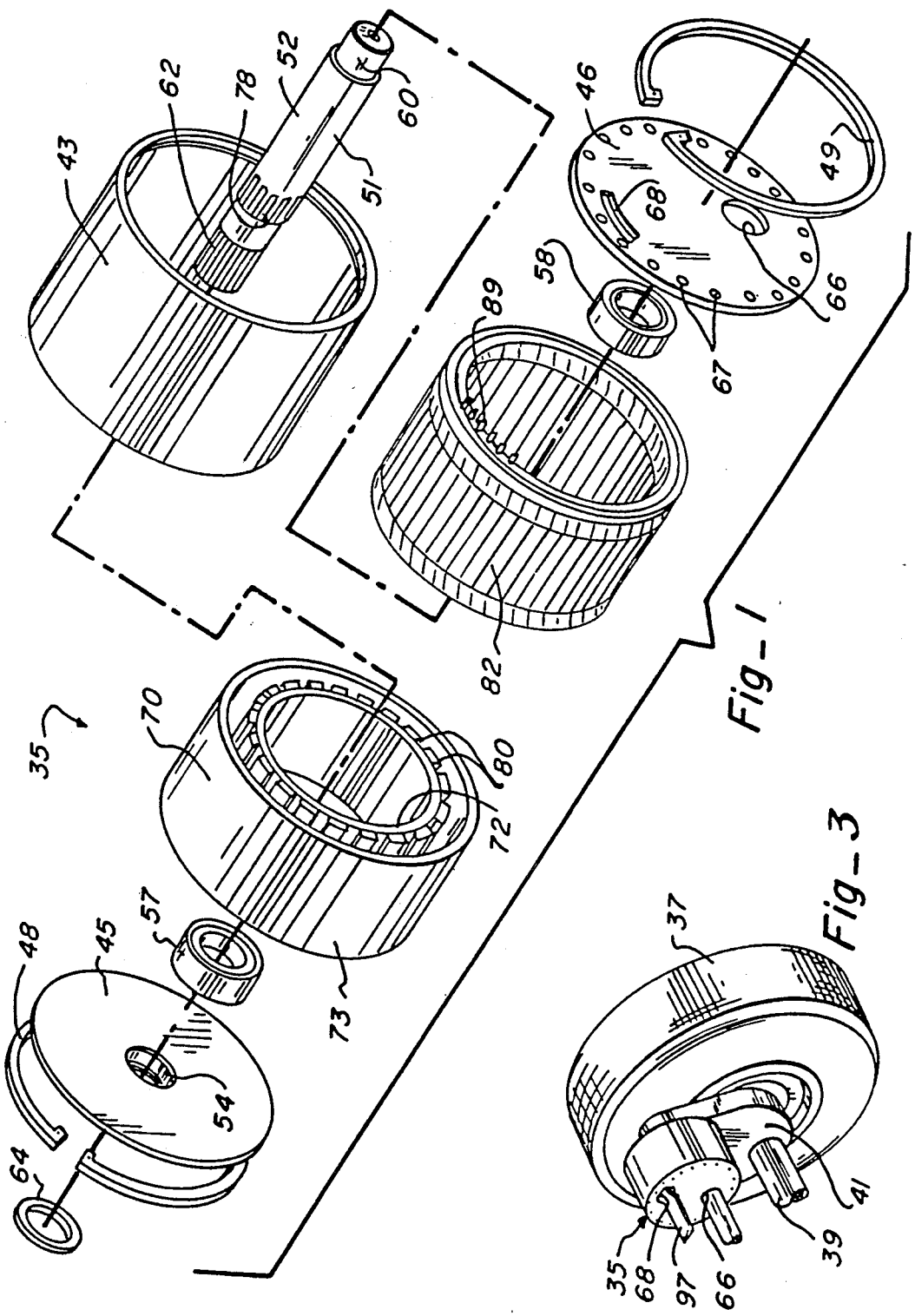

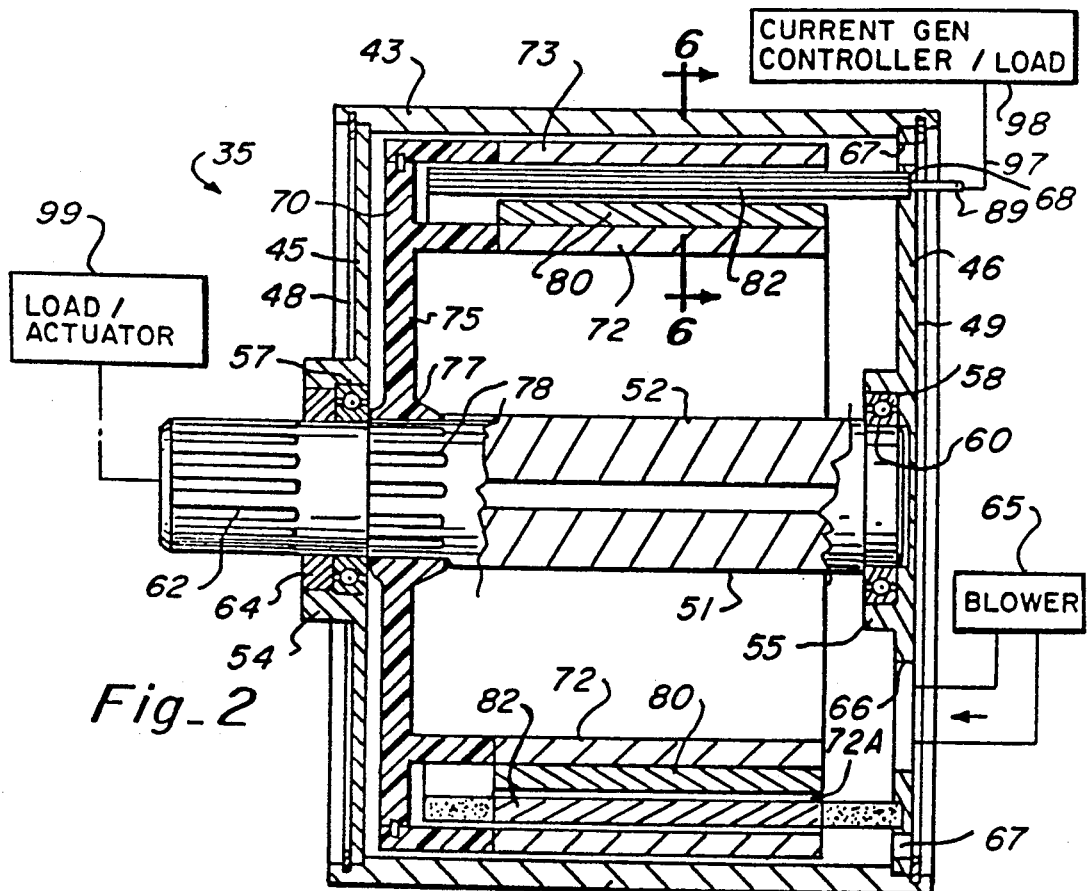
Fig_2
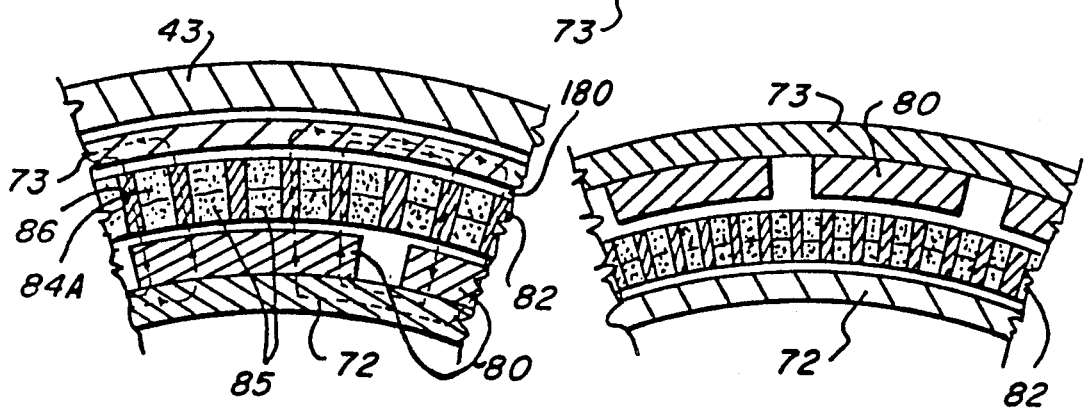
Fig_6    Fig_7

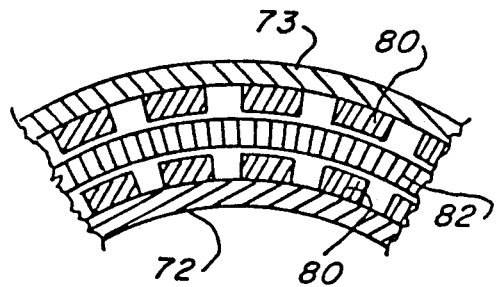
Fig_8
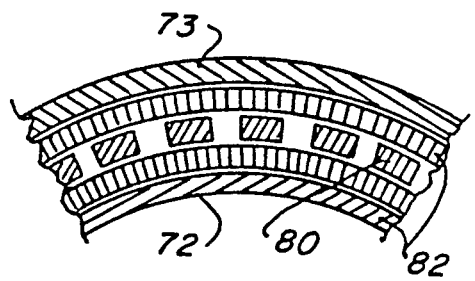
Fig_9
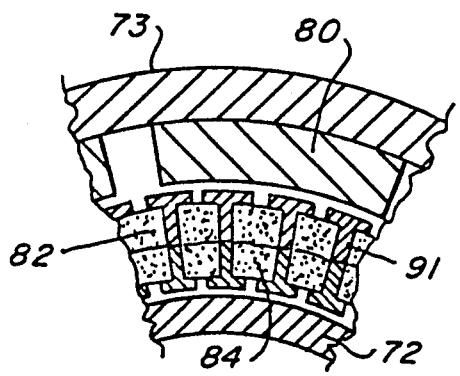
Fig_10
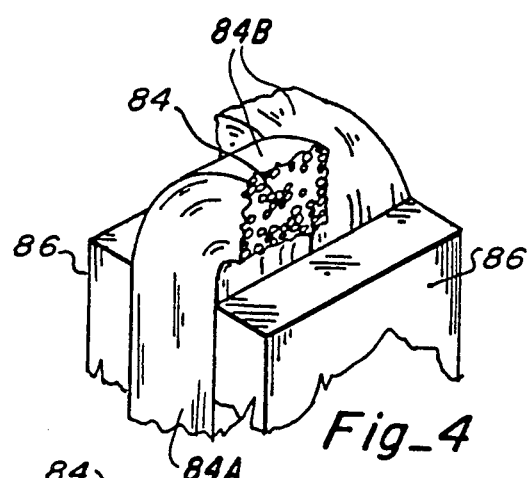
Fig_4
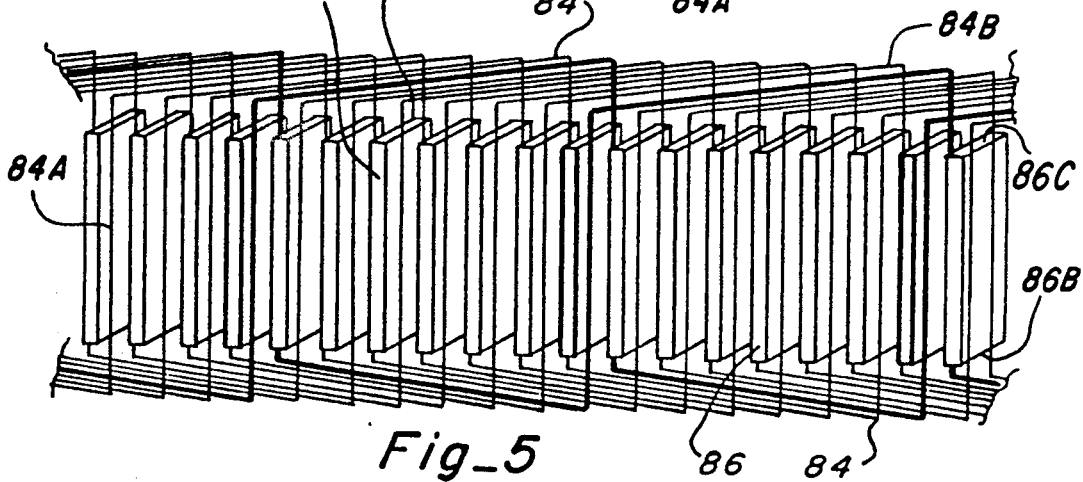
Fig_5

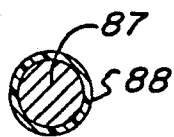
Fig_11
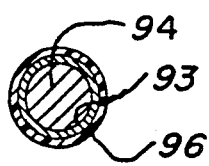
Fig_12
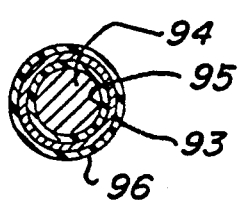
Fig_13
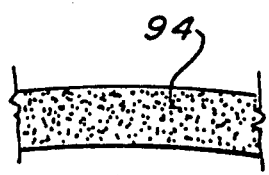
Fig_14
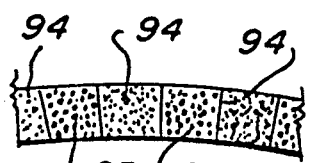
Fig_15
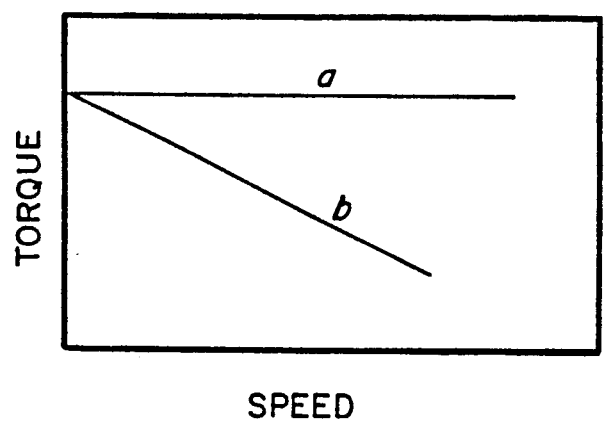
Fig_19
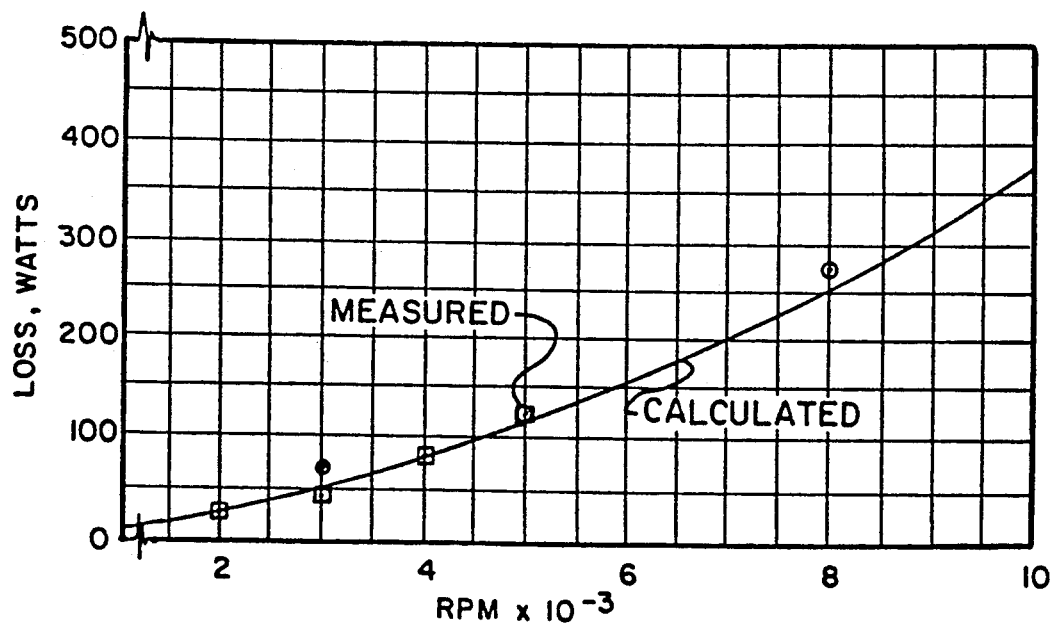
Fig_20

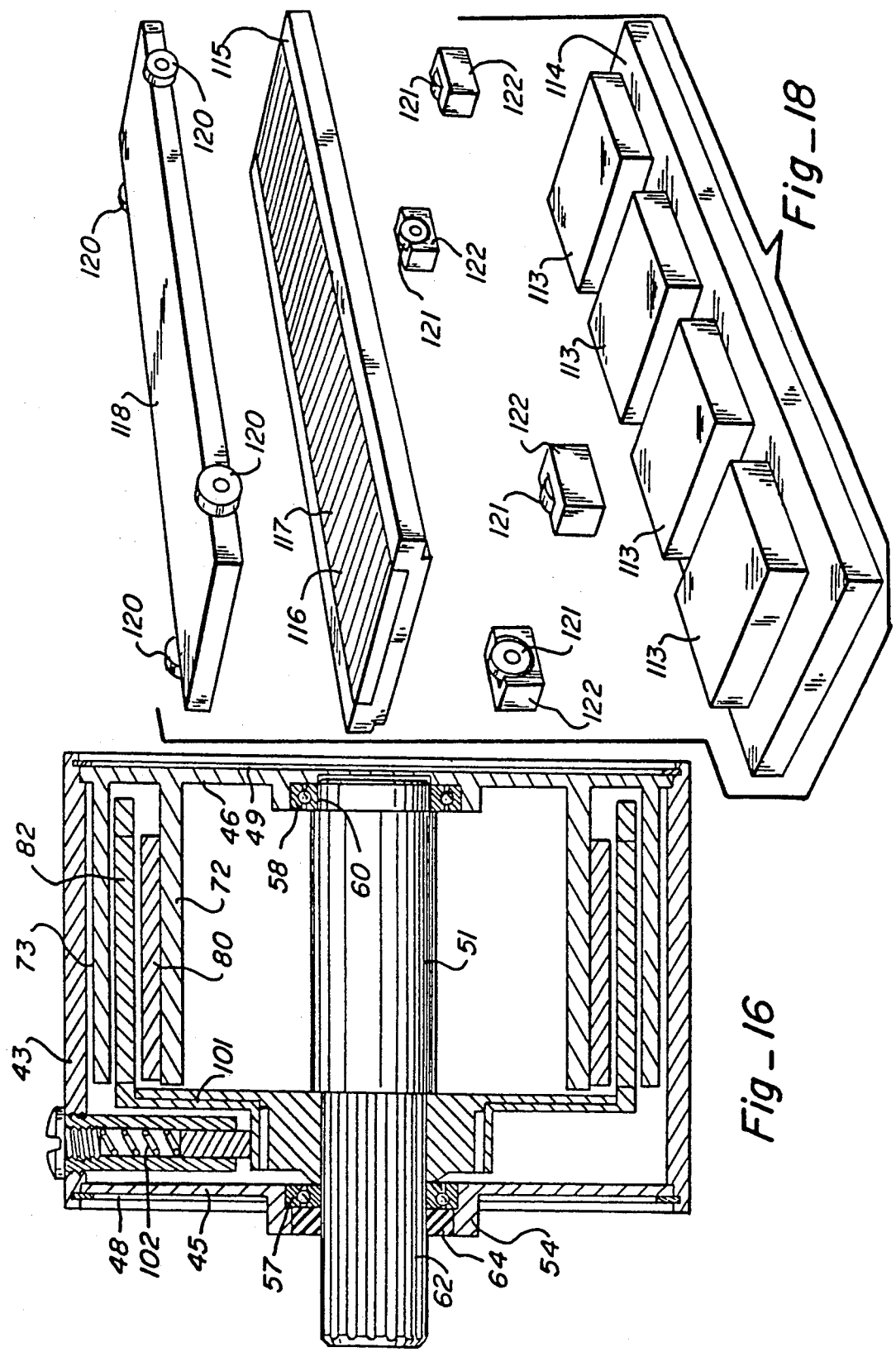
Fig_18
Fig_16

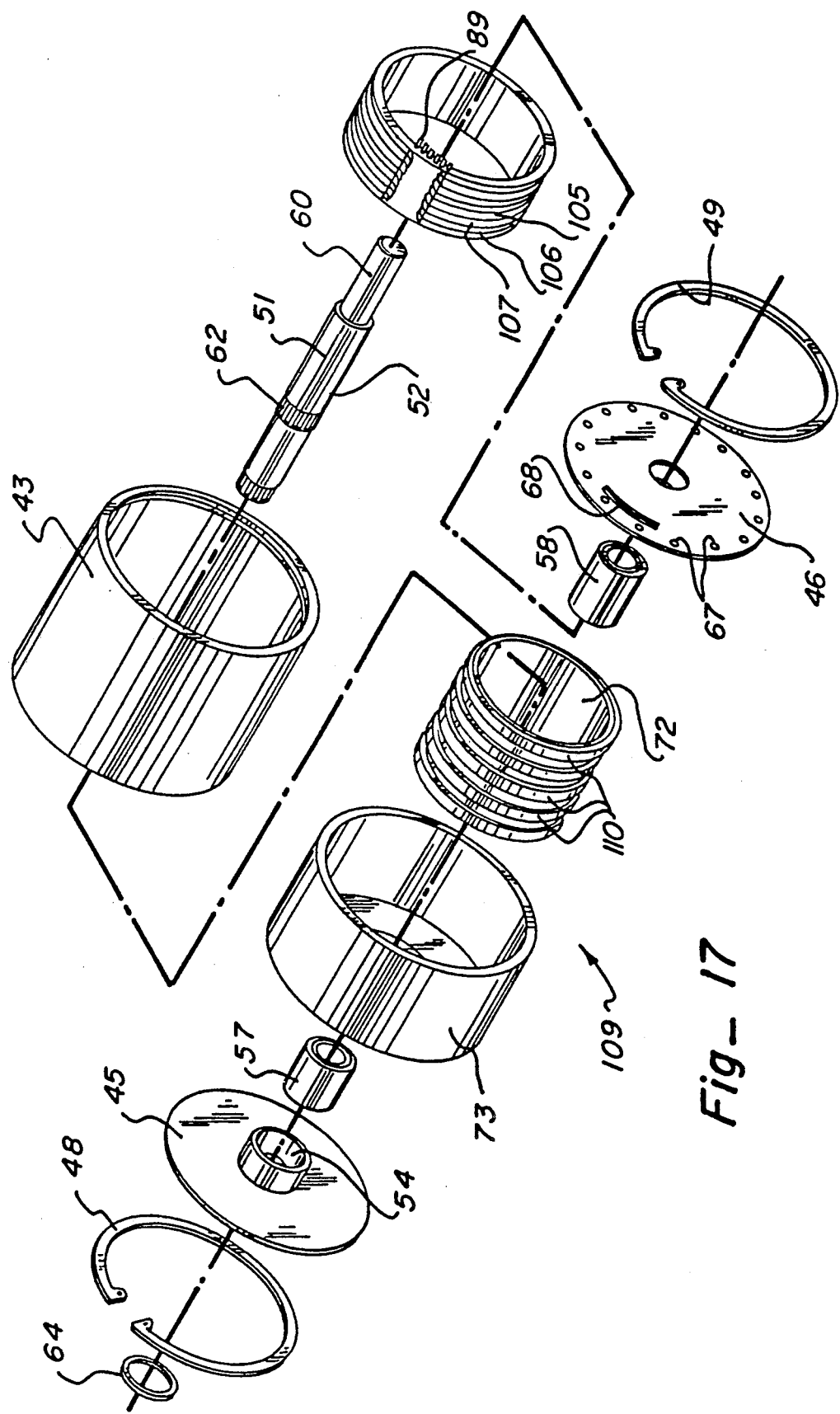

METHOD OF MAKING AN ELECTROMAGNETIC TRANSDUCER

This application is a continuation application of Ser. No. 07/502,230, filed Mar. 30, 1990 now abandoned, which is a continuation-in-part application of Ser. No. 07/125,781, filed Nov. 27, 1987 now U.S. Pat. No. 5,004,944 which is a continuation of Ser. No. 06/812,306, filed Dec. 23, 1985 now abandoned.

FIELD OF THE INVENTION

This invention also relates to an electromagnetic transducer, and, more particularly relates to a lightweight high power electromagnetic transducer capable of use as a motor, alternator or generator.

This invention also relates to a method of constructing an electromagnetic transducer, and more particularly, to a method of making the armature or stator of a transducer which is capable of use as a motor, alternator or generator.

BACKGROUND OF THE INVENTION

Electromagnetic transducers are known for use both in transforming electrical power into mechanical power and transforming mechanical power into electrical power. In both cases, power producing capability results due to relative movement between fields, as is well known, for example, in the application of this phenomenon to motors, alternators and generators.

While it is well known that motor, alternator and generator devices can be made that are quite light in weight, and while at least some known lightweight devices have been capable of operation at high speeds, such devices have not been capable of operation at high speeds to produce high power. For example, high power density devices of 0.6 horsepower per pound of weight are known for intermittent operation, but such devices are incapable of continuous operation at high power densities in excess of 1.0 horsepower per pound.

Known electromagnetic transducer devices have also not been capable of simultaneous high speed and high torque operation and/or have not provided adequate efficiency in operation. In addition, prior shell construction devices have not used both dispersed conductors and dispersed phase flux carrying means in the armature and have, therefore, also been limited to low speed, which, even at high torque, leads to low power density.

It is also well known that an electromagnetic transducer can include a stator and rotor arrangement, and that such an arrangement can include positioning magnetic elements on the rotor (see, for example, U.S. Pat. Nos. 3,663,850, 3,858,071, and 4,451,749), as well as on the stator (see, for example, U.S. Pat. Nos. 3,102,964, 3,312,846, and 3,602,749, 3,729,642 and 4,114,057). It has also been heretofore suggested that a double set of polar pieces could be utilized (see, for example, U.S. Pat. No. 4,517,484).

In addition, a shell type rotor has been heretofore suggested (see, for example, U.S. Pat. Nos. 295,368, 3,845,338 and 4,398,167), and a double shell rotor arrangement has also been suggested (see, for example, U.S. Pat. No. 3,134,037).

It has also been heretofore suggested that a bundle of wires can be utilized in place of a single conductor in the armature assembly of a motor (see, for example, U.S. Pat. Nos. 497,001, 1,227,185, 3,014,139, 3,128,402, 3,538,364 and 4,321,494, as well as British Patent No. 9,557) with such wires being stated to be for high voltage and high current usage and/or to reduce current flow loss, the so-called skin effect, and heating due to eddy currents, and with such wires being utilized in conjunction with solid and/or laminated cores (see, for example, U.S. Pat. Nos. 3,014,139, 3,128,402, and British Patent No. 9,557).

It has also been heretofore suggested that an electromagnetic transducer could have a power to weight ratio of up to about one horsepower to one pound (see, for example, U.S. Pat. No. 3,275,863). In addition, cooling of a motor, to increase power handling capability, using a gas, liquid, or a mixture of a gas and liquid, is well known (see, for example, U.S. Pat. No. 4,128,364).

While various arrangements for electromagnetic transducers have therefore been heretofore suggested and/or utilized, such transducers have not been found to be completely successful for at least some uses, including providing a lightweight transducer that is capable of providing high power.

In particular, the prior art does not teach the necessity to disperse the conductors to enable high speed operation, due, at least in part, to a widely taught theory that the magnetic field is very low in the conductors. With conductors built according to conventional teachings, however, it has been found that torque, at constant current, decreases with increasing speed, which result is contrary to the conventional expectation that torque would remain high as speed increases (which is the result achieved by this invention).

Prior art transducers are typically constructed such that the flux carrying elements are built up from laminated stacks of silicon steel, with heavy wire being wound directly in the wide, open slots between the laminated iron teeth. The tooth tips often cause wire breakage.

Conventional brushless DC motors up to six inches in diameter generally have a practical maximum of 36 laminated iron teeth. For a conventional three-phase motor, the number of slots per pole is three. Such motors have wedge or V-shaped slots (see FIG. 31) formed by the laminated teeth, with the result that the copper wires in the winding cannot be uniformly arranged such that the copper in some conductors (turns) cannot be located close to the iron teeth. For example, in a conventional six-inch diameter motor, the distance between the conductor farthest from the tooth (but inside the slot) is 0.158 inch. The resulting electromotive force (emf) induced in the turns of the coils is not at all uniform. This nonuniformity of emf requires circulating currents to be controlled by twisting the wires within the coil, resulting in less wire in the slot and more in the end turns and difficult manufacture.

Conventional motors also generally require a large number of turns per slot. This causes an increased reactive effect and large opposing magnetic fields. This results in greater degradation of power output.

SUMMARY OF THE INVENTION

This invention provides an improved electromagnetic transducer that is lightweight and yet provides high power conversion due to the high power density capability of the transducer, with the transducer being capable of operation as a highly efficient motor, alternator or generator, with the transducer of this invention being capable of continuous operation at high power densities in excess of 1.0 horsepower per pound.

High power density is effected by utilization of an armature assembly having dispersed conductors which are separated by dispersed phase flux carrying elements in a manner such that low opposing induced currents are created, as well as low eddy currents, to enable operation of the transducer at high efficiency with high torque being maintainable during high speed operation.

As the armature moves relative to a magnetic flux producing assembly, currents (which are often referred to as eddy currents) are established in the electrically conductive portions of the armature and these currents lead to heating and skin effects (which are collectively known as eddy current losses). However, these eddy currents also produce another effect not heretofore realized, whose flux is herein referred to as opposing flux since this flux alternates the main magnetic flux pattern and acts to reduce the torque with speed increase. This power conversion capability reduction with speed increase can occur even when the losses due to these currents are acceptable, and conventional practice would not suggest dispersing the conductors as has been done in the electromagnetic transducer of this invention.

It is therefore an object of this invention to provide an improved electromagnetic transducer.

It is another object of this invention to provide an improved electromagnetic transducer that is lightweight and yet provides high power so that the transducer has high power density.

It is still another object of this invention to provide an improved electromagnetic transducer that operates at high efficiency.

It is still another object of this invention to provide an improved electromagnetic transducer capable of use as a highly efficient motor, alternator or generator.

It is still another object of this invention to provide an improved electromagnetic transducer that is capable of continuous operation at high power densities in excess of one horsepower per pound.

It is still another object of this invention to provide an improved electromagnetic transducer having an armature assembly with dispersed conductors different sections of which have flux carrying elements positioned therebetween with the conductors and flux carrying elements being formed and positioned in a manner so as to create low eddy-currents and main flux pattern attenuation.

It is still another object of this invention to provide an improved electromagnetic transducer having an optimum thickness armature assembly which represents a balance among the effects of heat transfer to the cooling medium, heat production from resistance heating and other sources, and torque production.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiments of the herein disclosed invention are meant to be included as come within the scope of the claims.

It is also an object of the present invention to provide a method of constructing an electromagnetic transducer (e.g., a brushless DC motor), using conventional materials, which permits operation at high speed with high efficiency and high power output.

According to the invention, eddy current and hysterisis losses are minimized by utilizing a distributed winding having a multiplicity of narrow slots, combined with dense powdered metal flux carrying means inserted into the winding assembly, narrow magnets and a corresponding large number of poles. With simple forced air cooling, power densities of approximately two hp/lb in a six and one-half inch diameter by four inch long motor weighing eleven lbs have been demonstrated. With liquid or refrigerant gas cooling with phase conversion, power densities greater than four hp/lb are possible.

The armature or stator of this brushless permanent magnet DC motor is the component that gives this motor unique characteristics.

A first novel feature of this armature or stator is the integral flux bar that keeps the radial field strength high. The flux bars consist of insulated fine iron powder that is pressed together. To preserve the insulation feature and avoid fusing the particles together, the flux bars are not sintered as is commonly done in other applications. Since the bars are not sintered, the mechanical strength is low. The insulated particle feature keeps the eddy current losses low in an alternating magnetic field such as those produced by the rotor. The flux bars receive an additional insulation layer around the outer surface for structural support and wire abrasion resistance that otherwise could cause electrical shorts.

Another novel feature is the dispersed wire bundle that uniformly disperses the electric current within the conductor. This reduces the skin effect losses when the current is high such as under load. The wires parallel together and collectively the resistance is low. This low resistance of the Conductor reduces the $I^2R$ or current heating losses. The wire bundle conductor stiffness is low which facilitates manufacture. The total bundle stiffness is little more than that of one of the strands making up the bundle.

Another novel feature of this armature or stator is the wave or dispersed winding of the conductor such that each wire bundle reacts to each magnetic pole. In a preferred embodiment, there are 24 magnetic poles and six wire bundles, with each wire bundle lying in 24 slots. The wire bundles weave or braid through every sixth slot. The end loops that do not lie within the flux field are short. These factors increase the effectiveness of the copper and keep the weight low.

In this preferred embodiment, six wire bundles make the wave stator. A three phase wye electrical configuration allows two wire bundles per leg. These two coils connect external to the armature in series for high torque or in parallel for high speed. The wye configuration proves more efficient than the delta configuration by allowing no circulating currents. The resulting six wire bundles braid into stators that have at least one, two, three, or four wire turns per slot depending on voltage and current requirements.

The armature or stator according to the preferred embodiment has 144 flux bars and 144 slots with two wire turns per slot. As seen by the armature or stator, the rotating magnetic field has 12 pole pairs. Three Hall switches triggered by a magnet ring corresponding to the main field, control the electronic commutation. At any instant two series wire bundles have positive current and two wire bundles have negative current. Two of the six wire bundles are always off at any instant. Thus in the three-phase wye connection, two thirds of the copper conductors use current which is an efficient use of copper. This means that each leg of the three-phase wye connection receives a pulsating current such that for one period (1/12 of a rotor revolution) the current is positive ⅓, off 1/6, negative ⅓, off 1/6 of that period. The sequence in which each leg of the wye connection receives current determines the direction of rotation. The amplitude of the current pulse determines the torque of the motor.

The armature or stator according to the preferred embodiment is a shell configuration with a thickness of between approximately 0.25 and 0.35 inches. It attaches to the fixed end plate and must resist the torque producing forces as well as the heat from losses of the coils and the flux bars. It should, therefore, be a nonconductive assembly. Thus, the armature or stator assembly preferably consists of a fiberglass reinforced epoxy resin casting. This casting material provides a high temperature resistance of 180 degrees Centigrade. The air gap between the rotor and stator provides an air flow path to cool both components.

The invention is directed to a method of producing an armature for an electromagnetic transducer, which includes preparing a plurality of elongated high-permeability flux carrying members; preparing n wire bundles each having a predetermined length; winding the n wire bundles to provide a distributed winding configuration having a plurality of elongated open spaces; inserting the plurality of flux carrying members into the plurality of open spaces to provide a winding-flux carrying member assembly; and providing a bonding material around the winding-flux carrying member assembly to provide a rigid structure.

In the prior art, there is no technique whereby a winding assembly is first produced and thereafter flux carrying members are inserted into spaces in the winding assembly. The prior art provides only for first preparing a slotted iron structure formed of built-up laminated plates to provide teeth between the slots with the teeth functioning as flux carrying members. The wire is then wound on the slots in the slotted iron structure. The present invention in one embodiment revolutionizes the art of armature assembly in that it reverses the assembly process calling for first producing an armature wire winding configuration having a plurality of open spaces and thereafter inserting a plurality of flux carrying members into the plurality of open spaces.

BRIEF DESCRIPTION OF THE DRAWINGS

The above objects, advantages and features of the invention will be readily understood from the following description when considered in conjunction with the attached drawings.

The accompanying drawings illustrate complete embodiments of the invention according to the best mode so far devised for the practical application of the principles thereof, and in which:

FIG. 1 is an exploded isometric view of a rotary implementation of the electromagnetic transducer of this invention;

FIG. 2 is a side sectional view of the assembled electromagnetic transducer as shown in FIG. 1, along with additional elements illustrated in block form to better illustrate the invention;

FIG. 3 is a partial isometric view illustrating use of the electromagnetic transducer of this device configured as a traction motor to drive a wheel of an associated vehicle;

FIG. 4 is a partial isometric view showing the arrangement of the dispersed conductors and flux carrying elements of the electromagnetic transducer shown in FIGS. 1 and 2;

FIG. 5 is a diagram illustrating a typical arrangement of a two layer winding formed by the dispersed conductors and illustrating the flux carrying elements positioned between turns of the windings;

FIG. 6 is a sectional view taken through lines 6—6 of FIG. 2, with the magnetic flux path in the transducer also being illustrated;

FIG. 7 is a partially cut-away view similar to that of FIG. 6 but illustrating an alternate embodiment of the electromagnetic transducer of this invention;

FIG. 8 is a partially cut-away view similar to that of FIG. 6 but illustrating another alternate embodiment of the electromagnetic transducer of this invention;

FIG. 9 is a partial cut-away view similar to that of FIG. 6 but illustrating still another alternate embodiment of the electromagnetic transducer of this invention;

FIG. 10 is a partial cut-away view similar to that of FIG. 6 but illustrating yet another alternate embodiment of the electromagnetic transducer of this invention;

FIG. 11 is a partial end view illustrating a dispersed conductor, as best shown in FIG. 4, and illustrating the insulation layer around the conductor;

FIG. 12 is an end view similar to that of FIG. 11 but illustrating an alternate embodiment of the armature structure wherein the conductors have a coating of a flux carrying means (iron) thereon utilizable in lieu of the flux carrying elements as illustrated in FIGS. 4 through 10;

FIG. 13 is an end view similar to that of FIGS. 11 and 12 but illustrating another alternate embodiment of the armature structure wherein insulated conductors have a coating of a flux carrying means (iron) thereon utilizable in lieu of the flux carrying elements as illustrated in FIGS. 4 through 10;

FIG. 14 is a partial view illustrating the use of the embodiment of either FIG. 12 or FIG. 13 as the armature without use of separate flux carrying elements;

FIG. 15 is a partial view similar to that of FIG. 14 but illustrating use of alternating sections of dispersed conductors and dispersed conductors coated as shown in the embodiment of FIG. 12 or FIG. 13;

FIG. 16 is a side sectional view of an alternate embodiment of the electromagnetic transducer as shown in FIG. 2, and illustrates the armature fixed to the shaft as may be convenient to a brush commutated transducer;

FIG. 17 is an exploded isometric view of another alternate embodiment of the electromagnetic transducer of this invention, and illustrates a cylindrically symmetric linear implementation thereof;

FIG. 18 is an exploded isometric view of still another alternate embodiment of the electromagnetic transducer of this invention, and illustrates a flat linear implementation thereof;

FIG. 19 is a graph illustrating the relationship between torque and speed for a conventional transducer b and for the transducer of this invention a; and FIG. 20 is a graph illustrating tested eddy current, hysteresis and windage losses at different speeds of one example of the transducer of this invention.

DETAILED DESCRIPTION OF THE PREFERRED EMBODIMENTS

Figure 26:
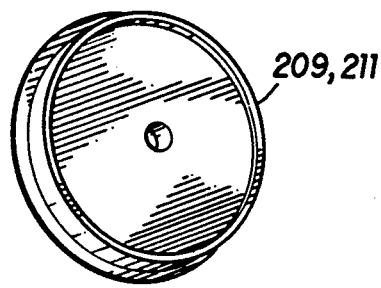
FIGS. 25 and 26 show end caps of the winding mandrel.

A novel electromagnetic transducer is particularly described herein, including alternate embodiments thereof. It is meant to be realized that the electromagnetic transducer of this invention may be utilized as a motor (ac or dc), or as an alternator or generator, depending on whether an electrical signal is conveyed to the armature (commonly through a commutator or equivalent structure) to create a force causing movement of the magnetic flux producing structure relative to the armature thus driving the shaft, or whether the shaft is rotated to thereby cause movement of the magnetic flux producing structure relative to the armature to create an electromotive force which, in turn, can cause movement of current along the conductors of the armature upon the application of a load as is well known.

Electromagnetic transducer 35, as best shown in FIGS. 1 and 2, is lightweight and yet is capable of delivering high power, with the transducer being a high power density device that is particularly well suited, for example, for use in conjunction with self-propelled vehicle applications, such as passenger cars, although the invention is not meant to be restricted thereto.

When used for vehicle propulsion, a permanent magnet, hollow cylinder electromagnetic transducer 35 may be utilized as an efficient wheel mounted traction motor, and may, as indicated in FIG. 3, be mounted directly at each wheel 37, adjacent to axle 39, with drive being preferably achieved through gear reduction mechanism 41.

As shown in FIGS. 1 and 2, electromagnetic transducer 35 includes an outer cylindrical housing 43, which housing has front and rear end plates 45 and 46 positioned at the opposite ends of the cylindrical housing by means of snap rings 48 and 49.

A shaft 51 has a central portion 52 extending through the cylindrical housing with the shaft being mounted in central hubs 54 and 55 of end plates 45 and 46, respectively, by means of bearings 57 and 58 so that the central portion of the shaft is coaxially positioned with respect to the cylindrical housing, the reduced diameter rear portion 60 of the shaft is mounted in bearing 58, and the front portion 62 of the shaft extends forwardly of front end plate 45, with seal 64 being positioned in hub 54 adjacent to bearing 57.

As also shown in FIG. 2, blower 65 is positioned adjacent to back, or rear, end plate 46, which plate includes offset air intake aperture 66 and a plurality of exhaust apertures 67 spaced about and near the periphery of the end plate. When so used, the transducer thus operates in a gas (air) medium (as opposed to a fluid medium which could include oil or the like, for example, as do some known transducers). In addition, an arcuate aperture 68 is positioned to allow armature conductor connections through end plate 46.

As best shown in FIG. 2, rotor 70 has a double shell configuration provided by inner and outer spaced cylindrical portions or walls 72 and 73 which extend normally from mounting disk 75 so that cylindrical portions 72 and 73 are coaxial with, and inside, cylindrical housing 43 and define an annular gap 72A therebetween. Mounting disk 75 has an annular mounting portion 77 which is received on splined portion 78 of shaft 51 inwardly of bearing 57.

Inner cylindrical portion 72 of rotor 70 has magnetic elements 80 mounted thereon, which magnetic elements are shown to be permanent magnets (but electromagnets could be utilized, if desired). Cylindrical portions 72 and 73 are formed of highly magnetically permeable with low hysteresis loss magnetic material (such as iron or steel, for example), and mounting disk 75 is formed of non-magnetic material (such as plastic or aluminum, for example), while magnetic elements 80 are high strength permanent magnets, which magnets are preferably formed of neodymium iron boron (NdFeB), but may also be formed of barium ferrite ceramic (BaFe Ceramic), samarium cobalt (SmCO), or the like.

Armature 82 comprises an annular member at least partially disposed within gap 72A and is fixed with respect to housing 43, and is mounted on rear end plate 46, as indicated in FIG. 2, so that rotor 70 rotates relative to armature 82 (as well as to housing 43). Armature 82 is thus a stationary cylindrical shell element that extends through the length of cylindrical housing 43 between the inner and outer cylindrical portions 72 and 73 of the rotor.

It is important to this invention that armature 82 include dispersed conductors 84, as best shown in FIG. 4, different sections 85 of which are positioned between flux carrying elements 86 as best shown in FIG. 6. The conductors 84 have discrete, spaced apart active regions 84A, as shown in FIGS. 4 and 5. As shown in FIG. 6, active regions 84A have a substantially rectangular cross-section. Between active regions 84A are a plurality of discrete elongated open space areas 86A (see FIGS. 5 and 6). A flux carrying means formed of a plurality of flux carrying members 86 of compressed iron powder are interposed in open space areas 86A between active regions 84A. Dispersed conductors 84 are preferably formed from a bundle of small diameter copper wires 87 surrounded by insulating material 88 (as best shown in FIG. 11), with conductors 84 being wound into a linking pattern, as indicated by way of example in FIG. 5, with the opposite ends of the wire bundles being connected to connectors 89 extending through aperture 68 in end plate 46, as indicated in FIG. 2.

Conductors 84, as best shown in FIG. 4, are formed into a bundle throughout the armature (as by being wound in a ring, for example), and each turn of the wire windings has a flux carrying element 86 therebetween, as shown in FIGS. 5 and 6, with a typical winding which constitutes a structurally integral annular winding structure being conceptually illustrated in FIG. 5.

Flux carrying elements 86 are preferably iron (at least in part), and extend between the active region or length 84A of conductors 84. Conductors 84 also have end turns 84B that extend beyond the active lengths 84A to connect the active lengths to each other in an appropriate pattern, such as a wave winding as shown, by way of example, in FIG. 5. The flux carrying elements 86 are preferably dispersed-phase flux carrying members to handle the high frequency magnetic field reversals with low opposing induced currents and low eddy current losses. Because iron is electrically conductive, it must be dispersed to avoid (or at least minimize) the creation of opposing induced currents. It has been found that a suitable flux carrying element 86 can be pressed from fine (10–100 micron) iron powder previously reactively coated with phosphate insulation and using "B" stage epoxy, which, as is known, is a partially cured epoxy that is still a thermoplastic at the time of use, and wax as binders.

By providing conductors comprising a plurality of small diameter wires with dispersed-phase flux carrying elements between turns of the wires, opposing induced currents are minimized sufficiently so as to allow operation of the electromagnetic transducer at high speeds and at high torque with such operation being conductable at high efficiency. In a working embodiment, a stationary armature shell incorporating windings of copper with powdered iron bars to carry the magnetic flux, and permeated with glass reinforced epoxy insulation material cast as a bonding agent 180 between the windings and bars, has been successfully utilized.

In this invention when used as a motor, at constant current, it has been found that the torque output can be maintained nearly constant even with increases in rotor speed, as illustrated in FIG. 19 by line a. This is quite unlike prior art devices wherein torque was found to drop off rapidly with increased speed when solid bars were utilized as conductors and as flux carrying elements, as illustrated in FIG. 19 by line b. The combination of high torque and high speed, made possible in the electromagnetic transducer of this invention, produces high power density.

As shown in FIG. 6, armature 82 (formed by the dispersed conductors 84 and flux carrying members 86) are closely spaced with respect to magnets 80 positioned about the inner cylindrical wall 72, and also closely spaced with respect to cylindrical wall 73, with walls 72 and 73 providing inner and outer return paths, respectively, for the magnetic flux. Some typical flux paths have been illustrated in FIG. 6. As shown, these flux paths are loops each of which penetrates the armature twice passing principally through the flux carrying members 86. The flux carrying members thus allow a thick armature to maintain a high flux density which is essential to high torque.

As indicated in FIG. 7, the electromagnetic transducer may also be configured by placing magnets 80 on outer wall 73 (rather than on inner wall 72). As indicated in FIG. 8, the electromagnetic transducer may also be configured by placing magnets 80 on both inner and outer walls 72 and 73.

As indicated in FIG. 9, an armature 82 can also be provided at both sides of magnets 80. In addition, while not specifically shown, it is also to be realized that the electromagnetic transducer could be configured by placing additional layers of armature-rotor elements radially inwardly and/or outwardly of that shown in the drawings. While flux carrying members 86 in the above embodiment are rectangular in cross-section, the flux carrying members may also be configured by utilizing a non-rectangularly shaped member such as, for example, an I-shaped member 91 (as indicated in FIG. 10) having dispersed conductors 84 extending therebetween.

The armature can also be configured as shown in FIG. 12 such that flux carrying elements 93 are formed as a coating of highly permeable magnetic material (such as iron) on some or all of the dispersed conductors 94. As indicated in FIG. 13, conductors 94 can also have an insulation layer 95 thereon so that insulation layer 95 is between the conductor and the flux carrying element. In either case, an insulating layer 96 covers the flux carrying element (unless it is, of itself, electrically non-conductive).

When the flux carrying elements are formed as coatings on the dispersed conductors (as indicated in FIGS. 12 and 13), the flux carrying bars (shown in FIGS. 4 through 10) need not be utilized. The dispersed conductors 94 with the flux carrying elements coated thereon can be utilized as the only elements of the armature (as indicated in FIG. 14) or can be alternated with dispersed conductor sections 85, i.e., dispersed conductors having no flux carrying element coating thereon (as indicated in FIG. 15.).

Powdered iron utilized as flux carrying elements 86 (as indicated in FIG. 6) provide three-dimensional phase dispersion, while flux carrying elements 93 coated on the dispersed conductors (as indicated in FIGS. 12 and 13) provide two-dimensional phase dispersion (iron lamination bars, on the other hand, when used as flux carrying elements provide only one-dimensional phase dispersion).

The electromagnetic transducer of this invention thus includes a magnetic flux producing assembly (having at least one pair of poles which can be embodied by using permanent magnets or electromagnets), and an armature assembly (which intercepts the magnetic flux produced by the magnetic flux producing assembly and has an alternating structure of conductive windings and flux carrying elements, which flux carrying elements can be referred to as armature iron). A winding can be used as the principal component of the armature with the winding consisting of bundles of separate conductors (which are referred to herein as dispersed conductors), with the use of dispersed conductors of fine wire permitting high speed rotation of the rotor when used in conjunction with dispersed-phase flux carrying elements.

The use of multiple, parallel extending, insulated conductors to reduce heating losses at high currents has been heretofore suggested (see, for example, U.S. Pat. No. 497,001), and it is well known in the motor art as a method to reduce skin effect losses in motors. Skin effect, however, causes losses at load only, whereas eddy current losses, which would be experienced when known devices are rotated at high speed, occur at no load. This distinction is as to the mechanism of the effect.

In the case of conductors of large cross section or conductive flux carrying elements of large cross section, as used at least in some prior known devices, as the frequency of the magnetic field reversal increases, the magnitude of the induced currents in the bars increases, and the induced currents react with the magnetic field to create a resisting torque which opposes the increase of rotational speed. Thus, known shell type devices are inherently limited to low speed by the reaction torque, and cannot be rotated at high speed and are therefore, unlike the device of the present invention, not suitable, for example, for use as traction motors in most practical applications.

When used as a motor, a means to displace (i.e., rotate) the magnetic field relative to the armature at high speed must, of course, also be provided so that electric power can be converted into mechanical power in a manner similar to that used by known motors. As indicated in FIG. 2, this can be accomplished by connecting leads 97 between connectors 89 of armature 82 and current generator and controller unit 98 so that unit 98 provides current to conductors 84 to cause rotation of rotor 70, with rotation of rotor 70 causing rotation of shaft 51 to drive with a load 99.

When used as an alternator or generator, actuator 99 causes rotation of shaft 51 which rotates rotor 70 to induce a voltage on conductors 84 and thereby generates electrical current flow from conductors 84 to a load 98. While not specifically shown in FIGS. 1 through 15, it is to be realized that the current generator and controller unit (or alternately the armature) includes necessary electric commutation devices, including those devices wherein commutation is performed electronically (as in a brushless DC motor, for example), as well as devices which employ rectifiers instead of commutation (as is often used in power generating applications).

FIG. 16 illustrates an embodiment of the electromagnetic transducer of this invention in which armature 82 is connected with shaft 51 by mounting disk 101, and inner and outer cylindrical walls 72 and 73 are fixed to housing 43. In this embodiment, the armature thus becomes the rotor with electric power being communicated with the armature by means of brushes/slip rings 102 (with brushes being utilized in the case of a DC machine, and slip rings being utilized in the case of an AC machine). The embodiment shown in FIG. 16 is preferred for some applications, particularly in the case of a DC commutated machine.

The transducer of this invention has a significant advantage over a conventional motor by utilization of a minimum amount of iron which undergoes flux reversal. That is, only the iron in the flux carrying elements in the armature is subject to the reversing flux as each pole is passed, and thus low hysteresis losses are experienced. In addition, the effects of flux leakage are reduced so that all of the armature windings experience the total flux change and thus are equally useful at producing torque.

The device of this invention also has significant heat transfer advantages. For this reason, the superior high power to weight ratio is further enhanced. A thin armature is made possible by the armature being made up entirely of insulated conductors except for the necessary volume of the flux carrying members. It is therefore possible to provide cooling to both the inner and outer surfaces of the armature.

By the principles of heat transfer, heat buildup in an armature, with constant surface temperature and uniform internal heating per unit volume, depends on the square of its thickness. For example, compare an armature 0.25 inches thick (as is possible in this invention) to a solid rotor, five inches in diameter (as is common in known devices). the heat buildup in such known devices is some 400 times as great as that of the transducer of this invention with such an armature. Clearly, the electromagnetic transducer of this invention can dissipate more heat than any known conventional transducer of similar power rating.

The electromagnetic transducer of this invention can be produced in several topological variations of the basic design. In addition to the rotating cylindrical shell configuration, by changing the orientation of the magnets and the windings, the motor can be made to produce a linear motion. Other variations (not shown) include pancake and conical configurations.

FIG. 17 illustrates a linear reciprocating implementation of the electromagnetic transducer of this invention wherein the magnetic flux producing section moves linearly with respect to the armature in a cylindrical configuration. To accomplish this end, armature 105 has dispersed conductors 106 and flux carrying elements 107 wound radially about shaft 51 (rather than extending parallel thereto as in the embodiment shown in FIG. 1), and rotor 109 has magnets 110 thereon that extend circumferentially around inner cylindrical wall 72 (rather than extending parallel to shaft 51 as in the embodiment shown in FIG. 1).

FIG. 18 illustrates another linear reciprocating implementation of the electromagnetic transducer of this invention in which the structure is flat. As shown, magnets 113 are mounted on flat lower return plate 114. Armature 115 is provided with dispersed conductors 116 and flux carrying elements 117 in the same manner as described hereinabove with respect to the other embodiments illustrated except that the armature is essentially flat rather than cylindrical. An upper return plate 118 is also provided, and armature 115 is movable linearly with respect to, and between, lower and upper plates 114 and 118 by means of rollers 120 mounted on the edges of upper plate 110 and rollers 121 mounted in roller mounting boxes 122 (carried by lower plate 114).

The basic configuration and geometry of a prototype transducer constructed according to the principles of this invention and based upon computer calculations are as follows (based upon the use of 24 magnets, conductors 0.008 inches in diameter, and 144 flux carrying elements as brought out more fully hereinafter):

| | |
|---|---|
| Power (at 10,000 rpm) | 40 HP |
| Voltage | 72 volts dc |
| Current | 425 amps dc |
| Diameter | 6.5 inches |
| Armature total thickness | 0.28 inches |
| Length | 3.5 inches |
| Weight | 15.0 lbs. |
| Efficiency (calculated at 10,000 rpm) | 97.6% |

More specifically, the motor calculations as set forth hereinabove are based upon the following motor calculations:

Geometric Parameters
$L1 = .125$  $L2 = .02$  $L3 = .25$  $L4 = .02$
$L5 = .3$   $L6 = .125$ $L9 = 2$   $R1 = 2.488$
$M1 = .684$ $M2 = .513$ $M3 = .171$ $M5 = .109$ $M6 = .054$
$XI = .5$   $M4 = .75$
Material Properties
$R9 = .075$    $U9 = .0000004$  $DE = .054$  $R0 = 1.7241$
$BR = 11506$   $UR = 1.05$      $RD = 5000$  $MD = .3$
$WD = .323$    $KM = .000001$   $N1 = 2$
Winding Variables
$DW = 8.000001E-03$  $PF = .42$  $VO = 72$  $IM = 425$  $NP = 3$
$NM = 24$    $NS = 2$  $NL = 2$  $SR = 1$  $YD = 2$
$NT = 1$     $MI = 2$
Magnetic Fields
$BA = 8000$   $BM = 10053$   $HM = 1378$   $BS = 16000$
$B - $ Inner $RP = 15181$   $B - $ Outer $RP = 17136$ -continued B — Back at 425 amps = 754   Max current at HD = 2042
P(1) = 7.3    P(2) = 1.2    P(3) = .3    P(4) = 3.7
Weights of the Component Parts
Copper = .72    Epoxy = .30    Magnets = 2.22
Stator iron = 1.11    Return paths = 2.32    Housing = 5.87
Shaft = 2.46    Total weight = 15.0
Electrical Parameters
Resistance = .0027    R per phase = .004
No load speed = 11164.7 rpm
Ft-lb at stall
(36154 amps) = 1644
Wires/conductor = 56    Effective length = 48
Stat. vol = 7.8    Conductor size is 0.054 by 0.125

Calculated performance as a function of speed
Losses in watts

| rpm | ft-lb | amps | I²R | eddy | hyst's | wind | hp | eff (%) |
|---|---|---|---|---|---|---|---|---|
| 1116 | 19.3 | 425 | 359.6 | 2.5 | 9.3 | .1 | 4.1 | 89.2 |
| 2233 | 19.3 | 425 | 359.6 | 10.2 | 18.6 | .6 | 8.2 | 94 |
| 3349 | 19.3 | 425 | 359.6 | 22.9 | 27.9 | 1.3 | 12.3 | 95.7 |
| 4466 | 19.3 | 425 | 359.6 | 40.7 | 37.2 | 2.6 | 16.4 | 96.5 |
| 5582 | 19.3 | 425 | 359.6 | 63.6 | 46.5 | 4.3 | 20.5 | 97 |
| 6699 | 19.3 | 425 | 359.6 | 91.6 | 55.8 | 6.6 | 24.6 | 97.3 |
| 7815 | 19.3 | 425 | 359.6 | 124.6 | 65.1 | 13.3 | 28.7 | 97.4 |
| 8932 | 19.3 | 425 | 359.6 | 162.8 | 74.4 | 18.6 | 32.9 | 97.6 |
| 10048 | 19.3 | 425 | 359.6 | 206 | 83.7 | 25 | 37 | 97.6 |
| 11033 | 19.3 | 425 | 359.6 | 248.4 | 91.9 | 31.7 | 40.6 | 97.6 |
| 11099 | 9.7 | 213 | 89.9 | 251.3 | 92.5 | 32.2 | 20.4 | 97 | wherein:
Units of length are inches
Fields are in Gauss B, Oersteds H
Losses are in watts
Forces are lb as are weights
P( ) = Gauss-in/Oersted, permeances of the flux paths
R = Resistance, ohms
and wherein:

| Parameter | Definition |
|---|---|
| L1 | Inner return path 72 thickness |
| L2 | Inner air gap |
| L3 | Armature 82 thickness |
| L4 | Outer air gap |
| L5 | Magnet 80 thickness |
| L6 | Outr return path 73 thickness |
| L9 | Magnet 80 length |
| MI | Option, 1 for magnets inside, 2 for out, 3 for both |
| M1 | magnet pitch |
| M2 | magnet width |
| M3 | gap between magnets at pitch line |
| M4 | M2 as a fraction of M3 |
| M5 | Amature iron pitch |
| M6 | mature iron width |
| XI | Iron fraction |
| NS | Iron pieces 88 per phase and per pole |
| NT | No. of conductors 84 per iron piece 86 |
| NL | No. of layers of winding |
| NC | Total no. of conductors 84 per phase |
| SR | No. of conductors per phase in series |
| NP | No. of phases |
| YD | Option, 1 for we and 2 for delta |
| NW | No. of wires per conductor |
| NM | No. of magnets 80 |
| PF | wire packing factor |
| DW | wire diameter |
| WD | density of wire material |
| DE | density of epoxy potting material |
| VO | Applied voltage |
| IM | Maximum current |
| NR | No load speed |
| R1 | Mean armature radius |
| RO | wire resistivity, microohm-cm |
| KM | Hysteresis loss constants |
| R9 | Gas/fluid density, lbm/cubic foot |
| U9 | Viscosity, lbf-sec/square foot |
| MG | Magnet option, 1 for ceramic, 2 for NdFeB |
| HC | pseudo coercive intensity = BR/UR |
| BR | residual flux density |
| MD | density of magnetic material |
| UR | recoil permeability |

-continued

| | |
|---|---|
| HD | coercive intensity at the knee |

For motor torque verification, the electromagnetic force was measured in an actual test in a linear configuration similar to that illustrated in FIG. 18, built to test computer simulation of a rotary configuration. A current of 125 amps produced a force of 50 lb.

The measured magnetic field (using Type B ceramic magnets) was 3500 gauss. The active conductor length scanned three of the four poles and consisted of twenty bars of copper, each 0.150×0.3125 inches in cross section. Each of the 3×20=60 conductors had an active length of three inches. Thus the total active conductor length was 3×60=180 inches. Using these values, the force was calculated to be 45 lb. the measured force of 50 lb compares well with the calculated force of 45 lb considering the accuracy of the test (for example, the magnetic field is not absolutely uniform everywhere, and fringing field effects were not considered).

Measured eddy current, hysteresis and windage losses for a transducer constructed according to the principles and description herein are shown in the graph of FIG. 20. This motor delivered 16 horsepower at 7800 RPM in preliminary testing.

As can be appreciated from the above, the electromagnetic transducer of this invention is thus able to provide an output power to weight ratio that is greater than one horsepower to one pound in a cooling gas medium (using air as the cooling medium), and is believed to be greater than five horsepower to one pound in at least some cooling mediums (with a five to one ratio being calculated for the prototype motor as set forth herein). It should be further appreciated from the above that this invention provides an improved electromagnetic transducer that is lightweight, compact, efficient and yet capable of delivering high power.

The essence of the transducer technology underlying the present invention lies in the arrangement of the mechanical elements of a motor so that continuous power densities in excess of four horsepower per pound of weight are attainable with conventional materials. Moreover, such arrangement has the effect of limiting rotational losses resulting in efficiencies in excess of 90% over virtually the total speed range, with peak efficiency at higher speeds in excess of 95%. Further, the arrangement of mechanical elements enhances the heat transfer capability of the armature in comparison with conventional technology.

Because of its extremely high power density, the present electrical machine has many applications where conventional devices are not as effective or are simply not usable. Such applications include those which are especially sensitive to size, weight and energy efficiency, e.g., land vehicle drive systems, marine drives, aircraft auxiliary power systems, electromechanical actuators and portable power generator sets. For example, applicant has been able to package electric traction motors in the hubs of small land vehicles whereas heretofore only mechanical or hydraulic transmission systems were considered feasible.

The present invention is able to achieve high power density in at least its transducers in the following two ways:

First, by the efficient operation of the machine at high speeds up to 10,000 rpm, thereby producing torque from a given device at a greater rate, and Second, through the elimination of most non-essential or non-working materials (copper and iron) in the structure of the machine.

It is important to note that in this case, efficiency and power density are interrelated. Conventional motors tend to become more inefficient (i.e., rotational losses increase) as their speed increases. Therefore, there is a practical limit to the amount of power that can be gained by running them faster.

By comparison, the present motor achieves higher efficiencies at higher speeds by means of a "distributed" winding which intersperses bundles of fine wire with high density flux carriers. The distributed winding has the effect of reducing rotational losses and the power output of a given device can, in fact, be increased with speed. At the same time, the overall size and weight of the device can be reduced because the configuration of the distributed winding improves the ratio of working to non-working material.

Thus, it can be said that the crux of the technology underlying the present invention lies in the basic geometry of the armature winding. It is this geometry that positions and combines the mechanical elements of the transducer (i.e., copper coils, flux producers, flux carriers and return path), in a completely new and novel way to achieve high speed and high power with high efficiencies over the entire speed range, but particularly at the high end. The basic composition of these mechanical elements, and a description of how their resulting electrical characteristics affect motor performance, are set forth below.

Figure 21:
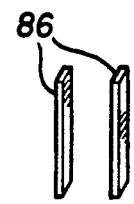
FIG. 21 illustrates a flux carrying member according to the invention.

The armature or stator assembly utilizes a distributed winding interspersed with powdered iron barb 86 (see FIG. 21), held together with epoxy resin, resulting in a rigid structure that can be independently manufactured as a subassembly to a high degree of accuracy. In other words, it is an inherently producible component.

The construction method of the present invention, i.e., braiding bundles of wire, e.g., fine copper wire, into a thin cylindrical "skein," results in very short end turns with a radial thickness comparable to that of the active part of the winding. The minimal amount of copper thus required for the non-working end turns significantly reduces the resistance and I²R losses of the armature, and the uniformity in thickness of the end turns simplifies the installation of the winding into the final assembly.

Conventional brushless DC motors up to six inches in diameter have a practical maximum of 36 laminated iron teeth. The geometry of one embodiment of the present invention can accommodate up to 144 powdered iron bars (equivalent to teeth).

The multiplicity of iron bars (teeth) in the present invention creates a similarly large number of winding slots of narrow width between the bars. This allows the number of slots per pole to be increased to a multiple of the minimum number of three (for a three-phase brushless motor). For given number of poles, e.g., ten, the number of slots per pole in a conventional three-phase motor is three, whereas the present invention could have five times as many, or up to fifteen. Therefore, each phase of a three-phase winding according to the invention can occupy five slots instead of one slot under each pole. This is what is meant by "distributing" the winding.

The wedge or V-shape of the slot formed by laminated teeth in conventional motors is avoided in the present armature which has substantially rectangular slots. In the present armature, as the number of bars increases, the shape of the resulting slots approaches that of a perfect rectangle. This rectangular shape permits a more uniform arrangement of the copper coils in the slot, therefore permitting the copper to be located closer to the iron. For example, in a conventional motor of six inch diameter, the distance between the conductor (turn) furthest from the tooth (but inside the slot) is 0.158 inch, whereas in the present invention this distance can be as little as 0.030 inch. The resulting electromotive force (emf) induced in the turns of the coils is therefore significantly more uniform that in a conventional armature.

The uniformity of the emf included in the multiplicity of coils in the present armature is important because it allows paralleling of wires within a coil which substantially reduces circulating currents and associated losses. In conventional motors, the non-uniformity of emf will not permit paralleling, and circulating current must be controlled by twisting the wires within the coil (i.e., the "Litz" wire technique). By avoiding the Litz wire technique, the present winding can accommodate more wire in the slot (with less in the end turns) and thus becomes easier to manufacture.

An important characteristic of the present motor concerns the performance gain from its relatively low armature reaction. Armature reaction is defined as the distortion of the primary magnetic field by the field produced when current flows through the motor windings.

Torque produced by a motor is proportional to the product of flux times current. The typical effect of armature reaction in a motor is a reduction in the effective flux as current increases, i.e., the torque constant (torque/amp) decreases as current increases. Eventually, at high current levels, the opposing magnetic field may be strong enough to demagnetize the permanent magnets.

The opposing magnetic field in any motor is proportional to the current level and the number of turns in the slot ($\phi \alpha NI$). The number of turns is critical because the reactive effect generated by each turn within the slot is additive. In the present motor, the number of turns in a slot is much lower because of the multiplicity of slots. As a result, the opposing magnetic field produced is much reduced over that of a conventional motor.

This yields a significant advantage relating to the number of turns per slot. In most embodiments of the present armature, it is unlikely that the number of turns per slot would exceed four, whereas in a conventional motor of similar electrical characteristics (voltage, current, speed), the number of turns per slot would total at least twelve. The larger number of turns per slot in the conventional motor therefore results in a greater degradation of power output due to the effect of armature reaction.

The use of fine wire in the winding results in a significant manufacturing advantage over heavy wire. Coils for the winding can be formed much more uniformly if fine wire is used. In the present armature, wire as small as forty AWG or even smaller can be used since the coils do not have to be wound directly in the slots as in a conventional lamination where the tooth tips often cause wire breakage.

The use of fine wire also reduces the losses associated with skin-effects. Skin effect is defined as the tendency of current flowing through a wire to migrate toward the surface or skin of the wire as its frequency increases, leaving the core of the wire unused and therefore nonproductive. By using several strands of fine wire with smaller radii as opposed to the conventional technique of fewer or single strands of large radius wire, the migration phenomenon is significantly lessened. This allows the current to penetrate or use more of the available copper at high frequencies.

Iron losses in conventional designs are usually reduced by building up the flux carrying elements from laminated stacks of silicon steel. The present invention achieves this result by using novel powdered iron compressed into small narrow bars and interspersed into the armature winding. The iron particles are treated chemically to insulate them from each other, thus simulating the effect of laminating the steel, but at a significant savings in material (i.e., weight). This arrangement is possible because the construction of the present winding does not require mechanical support from the iron.

The flux carrying bars 86 can be of simple rectangular form, I form or T form. The latter two forms result in a semi-closed slot-opening between bars which reduces the reluctance variation otherwise produced by the wide open slots and promotes a more uniform magnetic flux distribution resulting in quieter operation.

Amorphous metals in the form of compressed powder bars can also be used as the flux carrying elements between coils. These materials are capable of operating at higher flux-density levels than regular powdered iron. The amount of eddy current and hysteresis loss in amorphous metal is also lower than either powdered iron or silicon-iron, thereby improving overall efficiency.

The uniform radial thickness of the present winding structure allows the use of two cylindrical magnet rotors, one inside and the other outside the stator winding. This results in the conduction of a higher magnetic force through the winding than can be achieved in conventional motors. It also eliminates the iron losses in the flux return path since the return path rotates with the magnet.

Further, the multiplicity of narrow slots in the present armature allows the copper windings to be positioned within a much shorter span than in conventional designs. This means the corresponding pole-arcs can be made shorter which enables the utilization of a high number of poles. The direct advantage of a high number of poles is the reduction in the width of the back-iron, inasmuch as short pole-arcs require only a small amount of iron behind them to carry the flux. The reduced back-iron results in substantially lower motor weight and inertia. This reduction of back-iron is perhaps the single most important factor in reducing the material content and weight of the present motor. For a six inch diameter conventional brushless motor, the practical maximum number of poles is ten, whereas this number can be increased to 24 in one preferred embodiment of the present invention.

By using short pole-arcs which require less space for the back-iron, very high energy (smaller) magnets become practical to use. The resulting advantage is a high flux-density in the air gap with much less back-iron and weight.

Operating frequency refers to communication frequency which is equal to rotational speed (rev/sec) times the number of pole pairs. For one embodiment of the motor described herein at 10,000 rpm (167 rev/sec) and with 24 magnets (twelve pole pairs), the commutation frequency is 2000 Hz (167×12). This operating frequency is 4-5 times higher than any conventional motor at similar speeds. Such a high frequency results in lower percentage torque ripple.

In the final analysis, the performance of any electrical machine is limited by its ability to dissipate the heat generated as a result of rotational losses. The rigid armature of the present invention can be mounted to a variety of end plates and stationary magnetic return path structures to increase the flow of heat out from the winding via conduction. Moreover, the hollow cylindrical configuration of the armature provides two surfaces from which heat can also be dissipated. The hollow feature of the winding structure also provides of the implementation of gas cooling more readily than in a conventional lamination stack to further reduce the thermal resistance of the armature winding.

The process for assembling the wave or dispersed wire stator described here includes several separate operations. These steps can include powdered iron flux bar fabrication, deburring and insulating the flux bar, winding the stator, ending the wire bundles, sizing the stator, inserting the flux bars, and casting the stator assembly.

With the dispersed wire concept, a bundle of small wires replaces a single stand of heavy wire. The wire for stators defined by this embodiment is 32 gauge with a polyimide/polyamide insulation and can have a phenoxy adhesive coating. The adhesive is heat set for additional handling strength before casting. The insulation is the highest temperature insulation available rated in the 200 degree Centigrade class. The fine wires provide much more flexibility so the end loops gather close and are short.

Powdered iron particles are pressed into the flux carrying member or flux bar 86 (see FIG. 21) after being acid treated to provide an insulation of each metal particle. Insulating the metal particles reduces the eddy current losses when used in a high frequency alternating magnetic field. Flux bars 86 should show a high resistance value when probed with an ohmmeter. In a preferred embodiment thickness of flux bars 86 will preferably vary between 0.040 and 0.042 inch.

During fabrications of flux bars 86, a measured volume of powdered iron material is poured into a die cavity, with the powder being spread uniformly in the die cavity. A hydraulic press provides 80,000 PSI on the powdered iron particles. The press is released and the flux bar is ejected from the die cavity. A plurality of bars are produced by repeating the procedure. Each bar may be coated or wrapped with insulation material such as Nomex paper.

Figure 28:
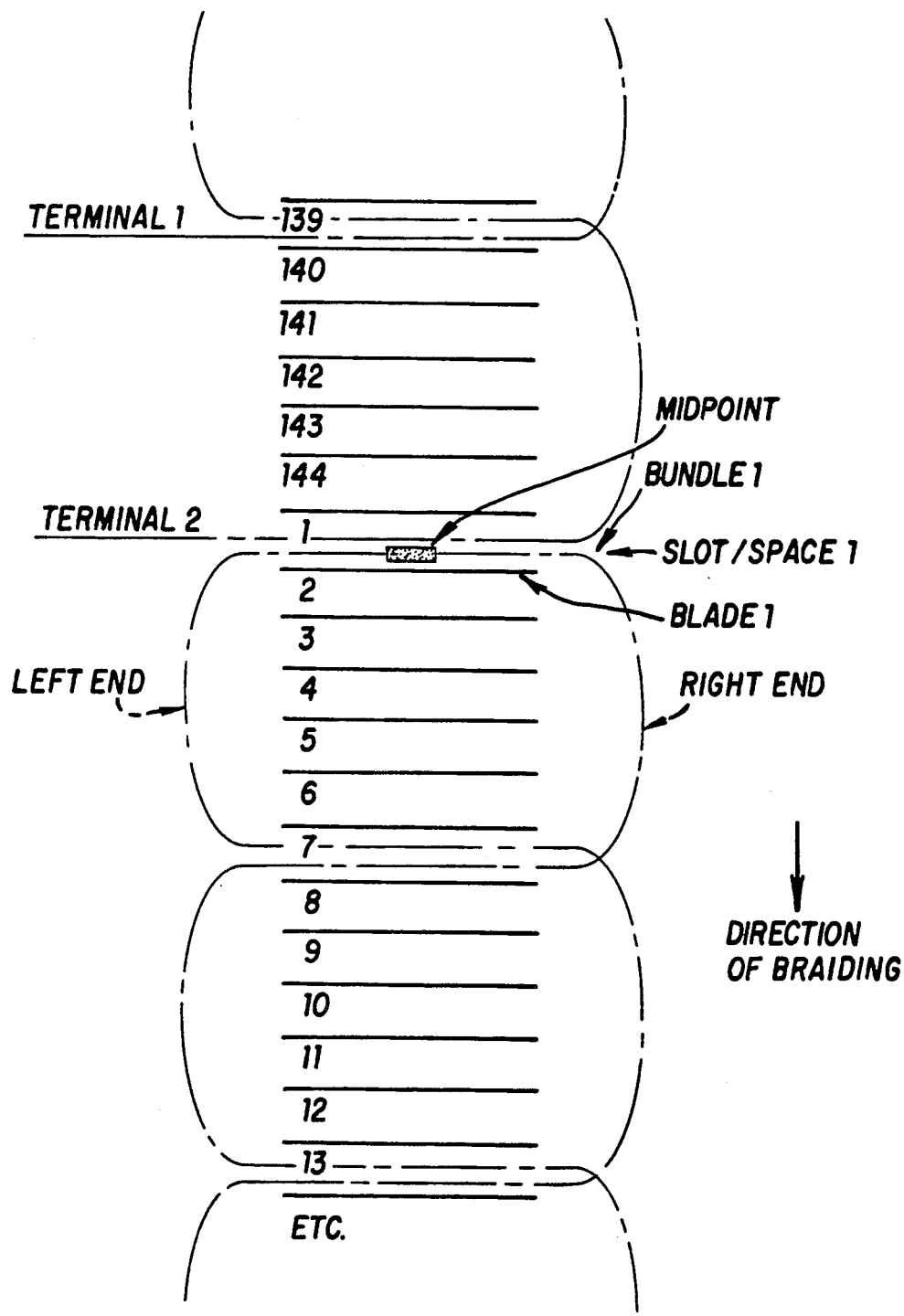
FIG. 28 is a schematic diagram illustrating the armature winding arrangement according to the invention.

Wire bundles are prepared using wire from spools as received. A large wheel that turns with nesting hooks unwinds the wire from the spools. Wire length can be adjusted by positioning the nesting hooks in various hole combinations on the wheel. A counter at the starting point of the wheel counts the turns. For example, according to a preferred embodiment, the length is 12.5 feet with 65 wires (65 turns) in each bundle. Removable polypropylene spiral wrap sleeves protect the wire bundles during handling and install over the wire between the nesting hooks. While the wire loop is on the wheel, the bundle loop center (opposite the start point) receives a tape mark. The loop start/end point receives a piece of tape on each side of the cut point that makes a bundle 12.5 feet long. The wire loop is cut after taping and labeling the ends. Six wire bundles are used in the stator so each receives a label 1 through 6 (See FIGS. 28–30) on each end.

As shown, for example, in FIGS. 22–27, a slotted winding mandrel or cylinder 201 for use with 144 removable blades 203 the same thickness and width as the flux bars 86 are inserted into slots 205 in mandrel 201 at 2.5 degree (2.5×144=36) intervals around the circumference or periphery of the mandrel. The blades are positioned such that one end is in the slots and another end projects outwardly from the surface of the mandrel at a substantially 90° angle. When the wire bundles are woven between the blades positioned in the mandrel slots as described in detail below, the wire bundles are formed and braided into the stator configuration desired. The outside diameter of the mandrel becomes the inside diameter of the stator. Removable blades 203 function to position and size the wire bundles for final flux bar insertion. Subsequently, the flux bars will occupy the positions formerly occupied by the removable blades. The blades are preferably formed of wax impregnated phenolic and resist bonding of the phenoxy adhesive wire coating during the thermal heat set operation if such adhesive wire is used.

Figure 24:
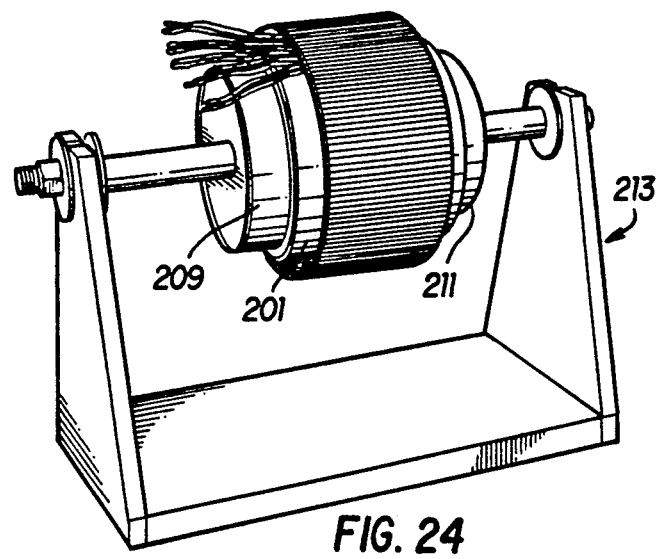
FIG. 24 shows a winding mandrel supported on a mounting assembly and a completed armature configuration wound on the mandrel.
Figure 25:
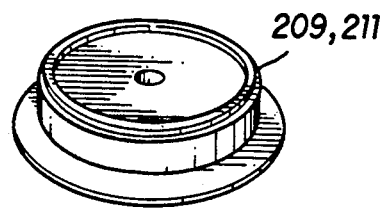
Figure 23:
FIG. 23 shows a removable blade for use with the mandrel of FIG. 22.
Figure 27:
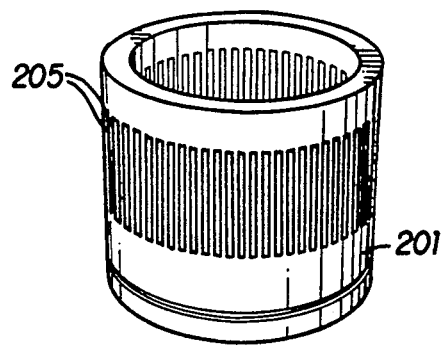
FIG. 27 is a perspective view of the winding mandrel.
Figure 22:
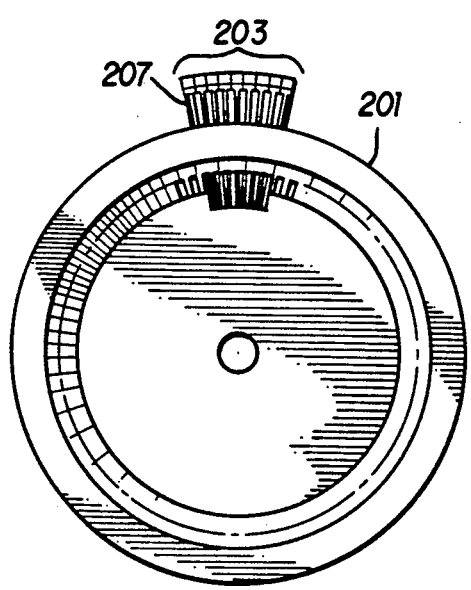
FIG. 22 shows a winding mandrel according to the invention.

As shown in FIG. 24, mandrel 201 has end caps 209 and 211 which are placed on support assembly 213 to enable the winding procedure to be carried out as described below.

Wiring begins with wire bundle 1 inserted into any space 207 between adjacent blades. The linear midpoint of the wire bundle (marked with tape) starts the braid process with equal lengths extending out of the ends of the selected space. The first space used becomes slot or space number 1, with the space number increasing to 144 in, e.g., a clockwise direction as viewed from the left end of the mandrel. The remaining wire bundles 2–6 install successively in a like manner in numerical order into adjacent spaces 2–6 between the blades while each time inserting the linear mid-point of the wire bundle into the space.

Next, the opposite ends of wire bundle 1 are moved under the other bundles toward space 7. The right end is inserted into space 7 first while the wires are smoothed and disengaged as they slip into the space. The left end is then inserted into the same space 7 on top of the previously inserted right end while the wires are similarly smoothed. Blade 7 (i.e., in slot 7 on the mandrel) is pressed down firmly to seat bundle 1 in space 7. The bundle ends are gently but firmly tensioned to form the loop between spaces 1 and 7. This procedure results in a winding pattern of two wire-turns per slot.

The above process is repeated for each succeeding bundle, i.e., the second through sixth bundles, by always moving the bundle ends under the other wires before being inserted into the appropriate space between the blades. For consistency, the right end is inserted into the space first and the wires are smoothed and stacked uniformly. Each blade is firmly pressed after the bundles are inserted into the appropriate space to seat the wires. The wires are then tensioned uniformly to make the end loops consistent.

Repeating the above process, the wire bundles are braided through the space 144. One end of bundle 1 terminates in space 139, and the other in space 1. This is illustrated schematically in FIG. 28 for bundle 1 only. Bundles 2–6 are braid in a similar manner to that described for bundle 1.

The bundle protective covers are removed as necessary while inserting the right end first, with the wire bundles being kept tensioned so the end loops are uniform. The wires go in numerical sequence for this two turn armature or stator embodiment. The wire bundles end while protruding out of the left side of the mandrel beginning with space 139. Wire bundle 1 is in space 139. The wire bundle number increase from 1 to 6 sequentially from space 139 to space 144. The wire bundles extending out of the right sides of spaces 139 through 144 are looped around and go into spaces 1 through 6. Four hose clamps are installed over the blades of the mandrel and are tightened securely. The next operation prepares the wire bundle ends for termination.

According to other preferred embodiments, other stator configurations are provided with four, three, or one wire turns per 144 slots.

A four turn per slot armature or stator braids like the two turn per space stator in the manner described above but with the difference that the wires are twice as long and they go around the mandrel circumference two times. The four turn per space stator can also be braided with twelve bundles including six main bundles of two sub-bundles each and wound like the stator described above and then adjacent turns in the same space are connected in series with each other when the braiding is complete.

In the three-turn per space stator, braiding starts at a point on the bundle, ⅓ of the distance from one end. In a similar procedure to the two-turn per space stator, the bundle is braided once around the mandrel. When this is completed, enough length of the bundle remains to go around the mandrel a second time but with only one end of the bundle. The second time around the winding pattern is similar to that of the one-turn stator described below.

Figure 29:
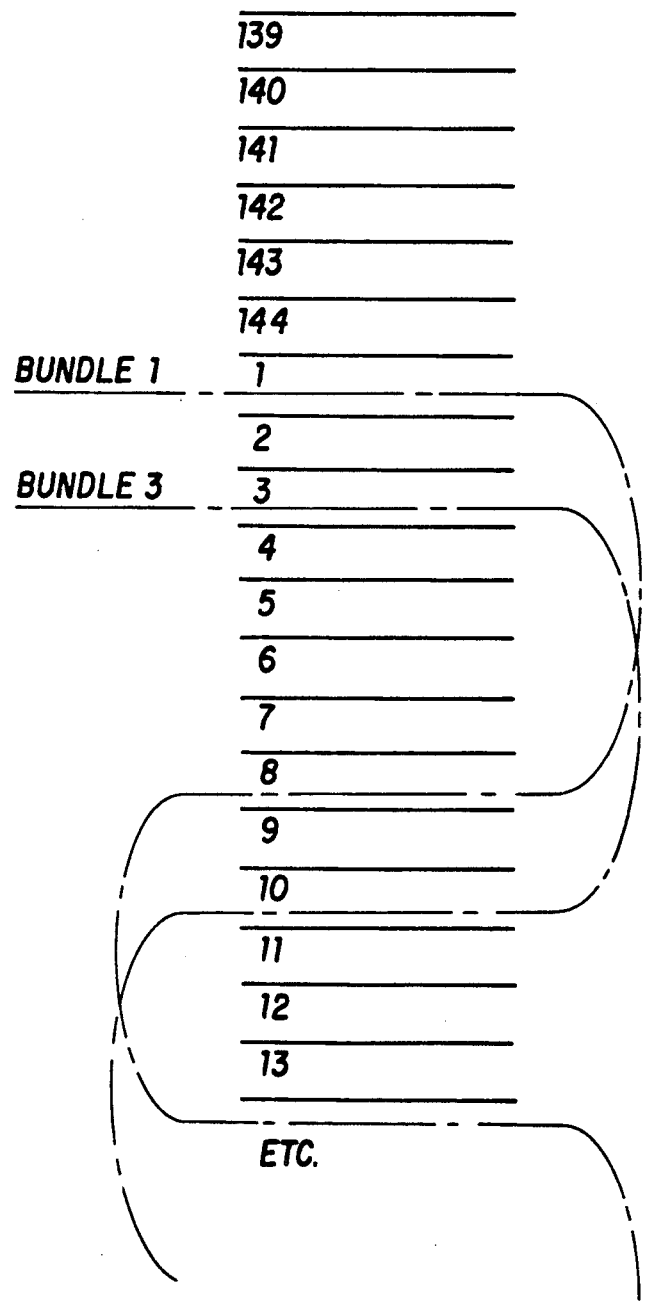
FIGS. 29 and 30 show additional schematic diagrams of the armature winding arrangement and phases thereof.

FIG. 29 shows the one-turn stator where the winding process starts at the end of the bundle rather than at any other point along its length. This pattern also differs from other patterns in the starting spaces of its six bundles. The ends of the bundles are inserted in alternate rather than adjacent spaces on the mandrel. Since only one bundle is inserted in each space to produce a one-turn stator, there is no braiding of the bundle as in the other patterns.

Figure 30:
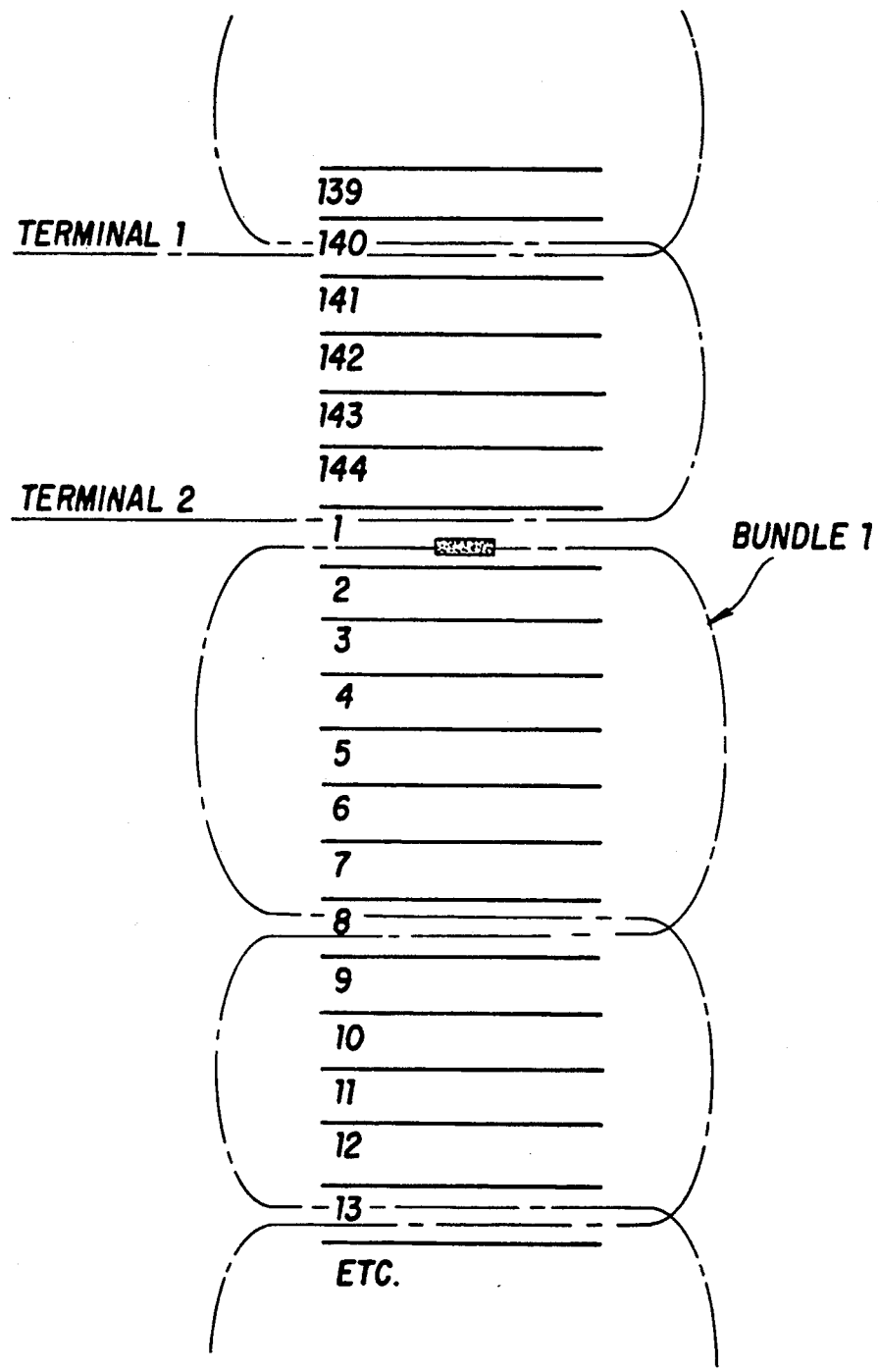
Figure 31:
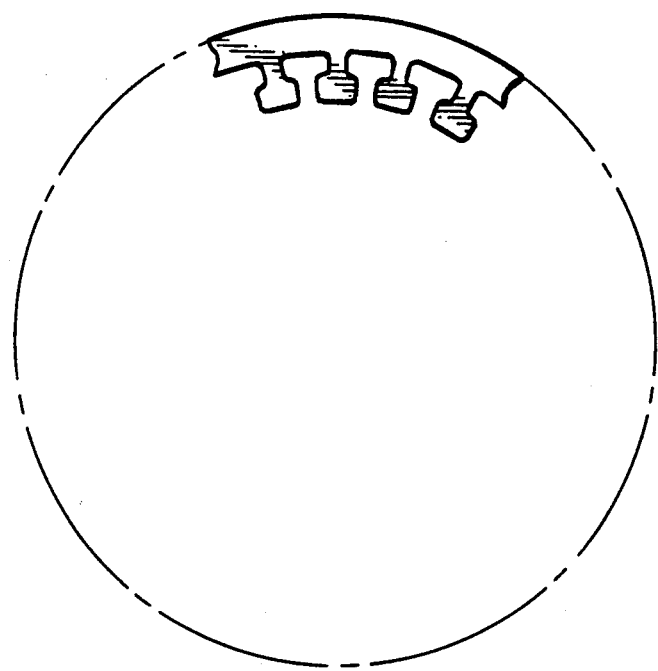
FIG. 31 illustrates a conventional slotted iron structure formed of built-up laminated plates.

The armature or stator variations described above allow limited optimization of the current and voltage ratings to meet the torque and speed specifications. To increase this flexibility the two bundles adjacent each other, which are normally connected in series, can also be connected in parallel. This choice of connection is still within any one of the three phases of the winding and not between phases. However, a parallel connection of two adjacent bundles will give rise to circulating current between them since the induced voltages in them are not identical. This dissimilarity is owing to their different locations in the stator. Therefore, a modification to the above patterns is devised in which the induced voltages in adjacent bundles are identical. In this modification, the coil pitch of each bundle is staggered between a short and long pitch compared with the regular 6-space pitch. For example, bundle 1 in FIG. 28 would be braided in space 8 instead of 7, and bundle 2 would be braided in space 7 instead of 8. This transportation would be repeated until all the braiding is completed around the mandrel. Looking at bundle 1, the coil pitch would in effect alternate between 7 and 5 spaces rather than a uniform 6 spaces, as shown in FIG. 30. The resulting induced voltage at the terminals of bundle 1 would still be the same as before, but it would also be the same as that of the adjacent bundle 2. Staggering can thus eliminate the difference in induced voltage of two adjacent bundles by continuously transposing their pitch in an alternating manner with only a small percentage loss in the final value of the voltage which can be easily compensated for by increasing the flux density level of the magnets of the transducer. This is an improvement over alternative winding methods in which different coils are grouped in specific ways to avoid circulating current as is done in other transducer designs.

The above description of bundles with staggered coil pitches applies to all the four patterns described earlier.

Switching from series to parallel connection of adjacent bundles can safely be done outside the motor/generator in the electrical circuit. The switching can occur while the transducer is running. The series connection provides extra torque at low speed while the parallel connection allows higher speeds of operation. The 3-phase winding assumed in all the above discussion is the wye configuration, since the delta configuration results in circulating currents between phases which do not have identical induced voltages either.

The following is a description of a procedure for terminating the twelve ends in the above-described six-bundle two turn per space configuration. When braiding is complete, beginning with terminal 1 in space 139, each bundle is twisted and tape is wrapped around all 12 ends. Then the excess of each bundle is cut off ⅜ inches from the edge of the tape. The wire insulation is stripped off beyond the tape with an appropriate chemical solution and then thoroughly cleaned. The tape is then removed, the wires are twisted around each other and the last ¼ inch of the bundle is tinned with solder. The bundles are then tested with a continuity meter to be certain that any one wire bundle does not short to another.

In an embodiment using wire with an adhesive coating four hose clamps over the blades on the stator mandrel are tightened. The wire-mandrel assembly is placed into a 300 degree F. oven for one hour. When the assembly has been in the oven for one hour, the hose clamps are removed and retightened. The assembly is allowed to cool to near room temperature, and then the blades and stator can be removed from the mandrel.

The armature or stator is removed from winding mandrel 201 (the blades can be removed with attention toward not dislodging wires as the blades retract from the slots). The casting plug is sprayed with mold release, and one uniform layer of fiberglass strand is wound over the surface of the casting plug. Thereafter, the stator is slipped over the casting plug. The insulated flux bars 86 are then carefully inserted between the wire bundles with the insulation joint always oriented in the same direction.

The outside diameter of the winding/flux bar assembly is uniformly wound with a fiberglass strand, while keeping a uniform tension on the fiberglass strand as it winds onto the stator. A loose build-up of fiberglass on the side away from the wire ends is provided to reinforce that side of the casting. A casting outer ring is installed over the winding/flux bar assembly, while keeping the fiberglass from moving as the casting outer ring slips over the stator. The ring is slowly tightened on the casting plug/armature, while using, for example, a 0.005 inch brass shim to bridge the ring gap on the inside of the ring tightens. Thereafter, the brass shim is removed and the ring is sealed with a strip of rubber.

It should be again checked that wire bundles 1 through 6 do not short circuit to each other. Mold end plates are then placed on the casting plug and outer ring assembly to prepare for the casting (bonding) stage. Necessary fittings and vacuum tubing are attached to the mold. Putty can be provided around joints as necessary to seal vacuum leaks.

The mold assembly is placed into a 300 degree F. oven for one hour to preheat. The mold assembly is removed from the oven and the hose is attached to the vacuum pump. The casting (bonding) procedure can use epoxy resin which is preheated and mixed just prior to pouring into the mold. The mixed resin is poured into the top of the mold and allowed to pump through the mold under vacuum for about 20 seconds. This assures a consistent flow of resin and removes any air bubbles in the mold. The vacuum line is removed and the mold assembly is returned to the 300 degree F. oven for 22 hours.

The mold assembly is removed from the oven after the cure period and allowed to air cool to near room temperature. For best results, the casting is disassembled from the mold while it is just above room temperature.

The stator is bonded with an epoxy resin that has physical and temperature resistance properties similar to the thermoset phenolic. Additions such as the fiberglass strands enhance the physical properties.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art.

We claim:

1. A method of producing an armature for an electromagnetic transducer, said method comprising:
   (a) providing an armature wire winding configuration having a plurality of open spaces;
   (b) inserting a plurality of discrete flux carrying members into said plurality of open spaces, said open spaces being interdigitated between a plurality of spaced-apart, elongated wire winding segments, adjacent ones of said winding segments being connected to one another, said discrete flux carrying members having an elongated shape corresponding to that of said open spaces; and
   (c) providing a non-electrically conductive bonding material around said winding/flux carrying member assembly to provide a substantially rigid structure.

2. A method of producing an armature for an electromagnetic transducer, said method comprising:
   (a) preparing a plurality of preformed discrete elongated high-permeability flux carrying members;
   (b) preparing n wire bundles, where in is at least two for a two-phase winding and at least three for a three phase winding, each said wire bundle having a predetermined length, each one of said wire bundles being formed of a plurality of substantially parallel wires;
   (c) winding said n wire bundles to provide a distributed winding configuration having a plurality of elongated open spaces;
   (d) inserting said plurality of flux carrying members into said plurality of open spaces in a one-to-one relationship such that one flux carrying member is in one open space to provide a winding/flux carrying member assembly; and (e) providing a bonding material around said winding/flux carrying member so as to provide a rigid structure.

3. The method as in claim 2, wherein said n wire bundles are wound to provide said distributed winding configuration and thereafter said plurality of flux carrying members are inserted into said plurality of open spaces.

4. The method as in claim 2, wherein the number of wire bundles is 6 and the number of said elongated open spaces is 144.

5. The method as in claim 2, wherein said open spaces are interdigitated between a plurality of spaced apart elongated wire winding segments, adjacent ones of said wire winding segments being connected to one another on each end by end wire turns, said flux carrying members having a shape corresponding to that of said open spaces.

6. The method of claim 5, wherein each said wire winding segment comprises a single turn of said wire bundles.

7. The method of claim 5, wherein each said wire winding segment comprises two turns of said wire bundles.

8. The method as in claim 5, wherein each said wire winding segment comprises three turns of said wire bundles.

9. The method as in claim 5, wherein each said wire winding segment comprises four turns of said wire bundles.

10. The method as in claim 2, wherein said rigid structure as in the shape of a cylindrical shell.

11. The method as in claim 2, wherein step (c) comprises winding said n wire bundles to provide said distributed winding configuration in the shape of a substantially cylindrical shell including a plurality of spaced-apart elongated winding segments wherein adjacent ones of said winding segments are connected to one another, said winding segments having said plurality of elongated open spaces interdigitated therewith.

12. The method as in claim 2, wherein step (b) comprises:
(i) providing a wheel having a predetermined circumference, said circumference being approximately equal to a desired length of said plurality of wire bundles;
(ii) winding wire onto said wheel to provide a first wire bundle formed of a predetermined number of turns of wire around said wheel;
(iii) cutting said first bundle at a starting point on said wheel at which said winding operation was initiated to form two ends of said first bundle;
(iv) providing a protective sleeve around said first bundle;
(v) marking a center point of said first bundle between said two ends; and
(vi) repeating steps (i)–(v) to form second through n wire bundles identical to said first bundle.

13. The method as in claim 2 wherein step (c) comprises:
(i) providing a winding mandrel comprising a cylinder having a plurality of slots on its surface oriented parallel to a longitudinal axis of said cylinder, said slots being uniformly spaced around a circumference of said cylinder;
(ii) providing a plurality of removable blades having one end positioned in said plurality of slots and another end oriented substantially perpendicular to a surface of said cylinder, said blades having a thickness and width as said flux carrying members, adjacent ones of said blades forming a space therebetweeen;
(iii) inserting a first bundle of said n wire bundles into a first space between adjacent ones of said blades such that a linear center point of said first bundle is generally positioned at a midpoint of said space;
(iv) inserting second through nth bundles successively into second through nth adjacent spaces between adjacent ones of said blades in a first direction around said circumference of said cylinder such that said second through nth bundles have said linear center points positioned respectively at midpoints of said spaces;
(v) moving said two ends of said first bundle in said first direction under said second through nth bundles toward a next adjacent space n+1 adjacent to said second through nth adjacent spaces, inserting said two ends into said next adjacent space n+1 and tensioning said two ends to form a loop between said first space and said n+1 space;
(vi) repeating step (v) for each successive second through nth bundle by moving said two ends of said second through nth bundles successively in said first direction toward next adjacent spaces, inserting said two ends in said respective next adjacent spaces and tensioning said two ends to form loops;
(vii) repeating steps (v) and (vi) until said first through nth bundles have been inserted into final ones of said spaces around said circumference of said cylinder;
(viii) terminating the ends of said first through nth bundles after said first through nth bundles have been inserted into said final ones of said spaces;
(ix) removing said blades from said slots in said cylinder; and
(x) separating said first through nth bundles from said cylinder, whereby the wire bundles braided as in steps (i)–(ix) form said distributed winding configuration.

14. The method as in claim 13, wherein step (vii) is repeated for a predetermined number of times in said first direction around said circumference of said cylinder whereby for each time around said cylinder the number of turns of said first through nth bundles per each said space is increased at least two.

15. The method as in claim 2, wherein step (a) includes preparing said flux carrying member by producing a plurality of insulated fine iron powder particles and pressing said insulated fine iron powder particles together to form said flux carrying members.

16. The method as in claim 2 wherein step (c) comprises:
(i) providing a winding mandrel comprising a cylinder having a plurality of slots on its surface, and slots being uniformly spaced around a circumference of said cylinder;
(ii) providing a plurality of removable blades each having one end positioned in one of said plurality of slots and another end oriented to project from said surface of said cylinder, said blades having a thickness and width as said flux carrying members, adjacent ones of said blades forming a space therebetweeen;

(iii) inserting a first bundle of said n wire bundles into a first space between adjacent ones of said blades such that a linear center point of said first bundle is generally positioned at a midpoint of said first space;

(iv) inserting second through nth bundles successively into second through nth adjacent spaces between adjacent ones of said blades in a first direction around said circumference of said cylinder such that said second through nth bundles have said linear center points positioned respectively generally at midpoints of said spaces;

(v) moving said two ends of said first bundle in said first direction under said second through nth bundles toward a next adjacent space n+2 adjacent to said second through nth+1 adjacent spaces, inserting said two ends into said n+2 adjacent space and tensioning said two ends to form a loop between said first space and said nth+2 adjacent space;

(vi) moving said two ends of said second bundle in said first direction under third through nth bundles to a next adjacent space n+1 adjacent to said third through nth+1 adjacent spaces, inserting said two ends of said first bundle into said nth+1 adjacent space and tensioning said two ends to form a loop between said second space and said nth+1 adjacent space;

(vii) repeating step (v) for each successive pair of second through nth bundle by moving said two ends of each bundle toward alternating next adjacent spaces, inserting said two ends in said respective next adjacent spaces and tensioning said two ends to form loops;

(viii) repeating steps (v)–(vii) until said second through nth bundles have been inserted into final ones of said spaces around said circumference of said cylinder;

(ix) terminating the ends of said first through nth bundles after said first through nth bundles have been inserted into said final ones of said spaces;

(x) removing said blades from said slots in said cylinder; and (xi) separating said first through nth bundles from said cylinder, whereby the wire bundles braided as in steps (i)–(x) form said distributed winding configuration.

17. A method of producing an armature for an electromagnetic transducer, said method comprising:

(a) preparing a plurality of preformed, discrete elongated high-permeability flux carrying members by producing a multiplicity of insulated fine iron powder particles and pressing a predetermined amount of said insulated fine iron particles together to yield said plurality of said flux carrying members;

(b) preparing n wire bundles each having a predetermined length, each one of said wire bundles being formed of a plurality of parallel wires;

(c) providing a winding mandrel comprising a cylinder having a plurality of slots on its surface oriented parallel to a longitudinal axis of said cylinder, said slots being uniformly spaced around a circumference of said cylinder;

(d) providing a plurality of removable blades each having one end positioned in one of said plurality of slots and another end oriented to project from said surface of said cylinder, said blades having a thickness and width generally as said flux carrying members, adjacent ones of said blades forming a space therebetween;

(e) inserting a first bundle of said n wire bundles into a first space between adjacent ones of said blades such that a linear center point of said first bundle is positioned generally at a midpoint of said first space;

(f) inserting second through nth ones of said n wire bundles successively into said second through nth adjacent spaces between adjacent ones of said blades in a first direction around said circumference of said cylinder such that said second through nth bundles have respective linear center points positioned respectively generally at midpoints of said spaces;

(g) moving two ends of said first bundle in said first direction under said second through nth bundles toward a next adjacent space n+1 adjacent to said second through nth adjacent spaces, inserting said two ends into said next adjacent space n+1 and tensioning said two ends to form a loop between said first space and said n+1 space;

(h) repeating step (g) for each successive second through nth bundle by moving two ends of said second through nth bundles successively in said first direction toward next adjacent spaces, inserting said two ends in said respective next adjacent spaces and tensioning said two ends to form loops;

(i) repeating steps (g) and (h) until said first through nth bundles have been inserted into final ones of said spaces around said circumference of said cylinder;

(j) terminating the ends of said first through nth bundles after said first through nth bundles have been inserted into said final ones of said spaces;

(k) removing said blades from said slots in said cylinder;

(l) separating said first through nth bundles from said cylinder, whereby the wire bundles braided as in steps (c)–(k) form a distributed winding configuration being in the shape of a substantially cylindrical shell including a plurality of spaced apart elongated winding segments wherein adjacent ones of said winding segments are connected to one another, said winding segments having a plurality of elongated open spaces interdigitated therebetween;

(m) thereafter inserting said plurality of flux carrying members into said plurality of open spaces in a relationship such that at least one flux carrying member is in one said open space to provide a winding/flux carrying member assembly, said plurality of flux carrying members being formed in a substantially elongated shape and said plurality of open spaces being formed in a substantially elongated shape; and (n) providing a non-electrically conductive bonding material around said winding/flux carrying member assembly to provide a substantially rigid structure.

18. A method of producing an armature for an electromagnetic transducer, said method comprising:

(a) preparing a plurality of preformed discrete elongated high-permeability flux carrying members;

(b) preparing n wire bundles, where in is at least two for a two-phase winding and at least three for a three phase winding, each said wire bundle having a predetermined length, each one of said wire bundles being formed of a plurality of substantially parallel wires;

(c) winding said n wire bundles to provide a distributed winding configuration having a plurality of elongated open spaces; and (d) inserting said plurality of flux carrying members into said plurality of open spaces in a relationship such that at least one flux carrying member is in one open space to provide a winding/flux carrying member assembly.

19. A method of producing an armature for an electromagnetic transducer, said method comprising:

(a) preparing a plurality of preformed, discrete elongated high-permeability flux carrying members by producing a multiplicity of insulated fine iron powder particles and pressing a predetermined amount of said insulated fine iron particles together to yield said plurality of said flux carrying members;

(b) preparing n (n>0) wire bundles each having a predetermined length, each one of said wire bundles being formed of a plurality of parallel wires;

(c) providing a winding mandrel comprising a cylinder having a plurality of slots on its surface oriented parallel to a longitudinal axis of said cylinder, said slots being uniformly spaced around a circumference of said cylinder;

(d) providing a plurality of removable blades each having one end positioned in one of said plurality of slots and another end oriented to project from said surface of said cylinder, said blades having a thickness and width generally as said flux carrying members, adjacent ones of said blades forming a space therebetween;

(e) inserting a first bundle of said n wire bundles into a first space between adjacent ones of said blades such that a linear center point of said first bundle is generally positioned at a midpoint of said first space;

(f) inserting second through nth ones of said n wire bundles successively into said second through nth adjacent spaces between adjacent ones of said blades in a first direction around said circumference of said cylinder such that said second through nth bundles have respective linear center points positioned respectively generally at midpoints of said spaces;

(g) moving two ends of said first bundle in said first direction under said second through nth bundles toward a next adjacent space n+1 adjacent to said second through nth adjacent spaces, inserting said two ends into said next adjacent space n+1 and tensioning said two ends to form a loop between said first space and said n+1 space;

(h) repeating step (g) for each successive second through nth bundle by moving two ends of said second through nth bundles successively in said first direction toward next adjacent spaces, inserting said two ends in said respective next adjacent spaces and tensioning said two ends to form loops;

(i) repeating steps (g) and (h) until said first through nth bundles have been inserted into final ones of said spaces around said circumference of said cylinder;

(j) terminating the ends of said first through nth bundles after said first through nth bundles have been inserted into said final ones of said spaces;

(k) forming said first through nth bundles, whereby the wire bundles braided as in steps (c)-(i) form a distributed winding configuration being in the shape of a substantially cylindrical shell including a plurality of space apart elongated winding segments wherein adjacent ones of said winding segments are connected to one another, said winding segments having a plurality of elongated open spaces interdigitated therebetween;

(l) removing said blades from said slots in said cylinder and inserting said plurality of flux carrying members into said plurality of open spaces in a relationship such that at least one flux carrying member is in one said open space to provide a winding/flux carrying member assembly, said plurality of flux carrying members being formed in a substantially elongated shape and said plurality of open spaces being formed in a substantially elongated shape; and (m) thereafter providing a non-electrically conductive bonding material around said winding/flux carrying member assembly to provide a substantially rigid structure.

20. The method as in claim 19 wherein in step (k) forming said wire bundles further comprises heating said bundles.

* * * * *

UNITED STATES PATENT AND TRADEMARK OFFICE
CERTIFICATE OF CORRECTION

PATENT NO. : 5,319,844
DATED : June 14, 1994
INVENTOR(S) : Hao HUANG et al.

It is certified that error appears in the above-indentified patent and that said Letters Patent is hereby corrected as shown below:

Column 22, line 57, "(b) preparing n wire bundles, where in is at least two" should read --(b) preparing n wire bundles, where n is at least two--.

Signed and Sealed this

Twenty-first Day of February, 1995

Attest:

BRUCE LEHMAN

*Attesting Officer*     *Commissioner of Patents and Trademarks*